(12) United States Patent
Pierson et al.

(10) Patent No.: US 7,736,120 B2
(45) Date of Patent: *Jun. 15, 2010

(54) PALLETIZER PULLER BAR

(75) Inventors: Cary Michael Pierson, Milwaukie, OR (US); Stephen L. Heston, West Linn, OR (US)

(73) Assignee: Toptier, Inc., Portland, OR (US)

( * ) Notice: Subject to any disclaimer, the term of this patent is extended or adjusted under 35 U.S.C. 154(b) by 88 days.

This patent is subject to a terminal disclaimer.

(21) Appl. No.: 10/857,590

(22) Filed: May 28, 2004

(65) Prior Publication Data

US 2005/0063815 A1    Mar. 24, 2005

Related U.S. Application Data

(63) Continuation-in-part of application No. 10/822,112, filed on Apr. 8, 2004, now abandoned, which is a continuation-in-part of application No. 09/920,317, filed on Aug. 1, 2001, now abandoned.

(51) Int. Cl.
*B65G 57/22* (2006.01)

(52) U.S. Cl. ............... 414/792.6; 414/788.9; 414/789.8; 414/791.1; 414/790.3; 414/791.6; 198/430; 198/431; 198/468.11; 198/531

(58) Field of Classification Search .............. 414/790.3, 414/791.6, 792.6, 789.3, 788.9, 789.8, 791.1; 198/429, 430, 468.9, 468.11, 431, 433, 459, 198/409.1, 459.6, 531, 419.1; 53/543

See application file for complete search history.

(56) References Cited

U.S. PATENT DOCUMENTS

| | | | | | |
|---|---|---|---|---|---|
| 1,839,375 | A | * | 1/1932 | Covey | 198/430 |
| 1,883,369 | A | * | 10/1932 | Hardman | 198/418.1 |
| 2,001,332 | A | * | 5/1935 | Ross | 198/430 |
| 2,077,830 | A | * | 4/1937 | Failinger | 198/430 |
| 3,848,724 | A | * | 11/1974 | Belk | 198/418 |
| 4,055,257 | A | * | 10/1977 | Krebs | 414/793.5 |
| 4,108,061 | A | * | 8/1978 | Bowser | 100/7 |
| 4,214,848 | A | * | 7/1980 | Verwey et al. | 414/793.5 |
| 4,372,722 | A | * | 2/1983 | Van Horn | 414/789.7 |
| 4,993,915 | A | * | 2/1991 | Berger et al. | 414/796.9 |
| 5,984,620 | A | * | 11/1999 | Heston | 414/791.6 |
| 6,371,720 | B1 | * | 4/2002 | Ouellette | 414/791.6 |
| 6,533,533 | B1 | * | 3/2003 | Heston | 414/791.6 |

FOREIGN PATENT DOCUMENTS

GB    2026429 A    *    2/1980

OTHER PUBLICATIONS

Merriam-Webster's 10$^{th}$ Edition Collegiate Dictionary definition of "above".*

* cited by examiner

*Primary Examiner*—Michael S Lowe
(74) *Attorney, Agent, or Firm*—Peter A. Haas, Esquire LLC

(57) ABSTRACT

In an item-handling device, a layer head includes an item layer building platform defining an item receiving plane, the layer building platform being vertically positionable. A puller bar mounts to the layer head and moves in relation thereto within a plane above the item-receiving plane. The puller bar is positionable between a retracted position above the layer building platform and an extended position offset from the layer building platform.

5 Claims, 33 Drawing Sheets

RIGHT ANGLE DOS 1

PALLETIZER PULLER BAR

RELATED APPLICATIONS

The present invention is a continuation-in-part of U.S. patent application Ser. No. 10/822,112 entitled SUBMERGED CLAMP BAR and filed Apr. 8, 2004, now abandoned which was a continuation-in-part of U.S. patent application Ser. No. 09/920,317 entitled SYNCHRONIZED PALLETIZER and filed Aug. 1, 2001, now abandoned.

BACKGROUND OF THE INVENTION

The present invention relates generally to article manipulation devices and particularly to a palletizing device and method of operation.

Palletizers receive a sequence of items and produce a palletized stack of items. Generally, items are formed into rows, rows formed into layers, and layers stacked upon a pallet to form a palletized stack of items. Thus, a typical palletizer receives a series of items and organizes the items by row, by layer, and ultimately as a palletized stack of items on a pallet.

Palletizing calls for efficiency. In many applications, time is most critical. A palletizer more efficiently, i.e., more quickly, organizing an incoming series of items into a palletized stack of items represents advantage in greater production levels, i.e., greater item throughput.

Another important palletizing consideration is size. A more compact machine takes less floor space and, if necessary, accommodates more palletizing machines in the same area as would be occupied by relatively larger palletizing machines. Compact size is, therefore, a desirable feature in a palletizer.

Accordingly, it would be desirable to provide a palletizer having both improved time efficiency and reduced overall size relative to conventional palletizing devices. The subject matter of the present invention provides such a palletizer.

SUMMARY OF THE INVENTION

In an item-handling device, a layer head includes an item layer building platform defining an item receiving plane, the layer building platform being vertically positionable. A puller bar mounts to the layer head and moves in relation thereto within a plane above the item-receiving plane. The puller bar is positionable between a retracted position above the layer building platform and an extended position offset from the layer building platform.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
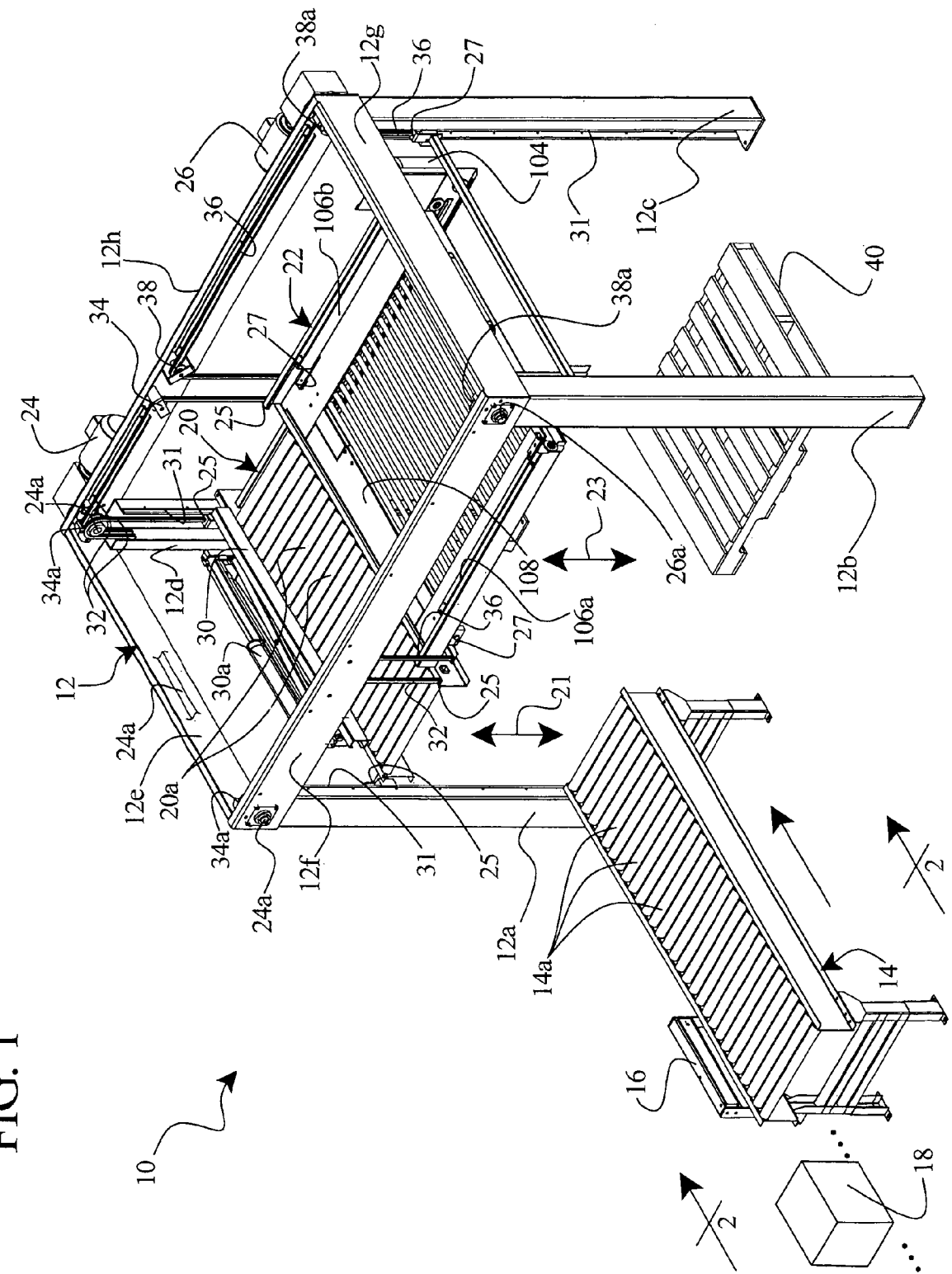
FIG. 1 illustrates in perspective a synchronized palletizer.
Figure 2:
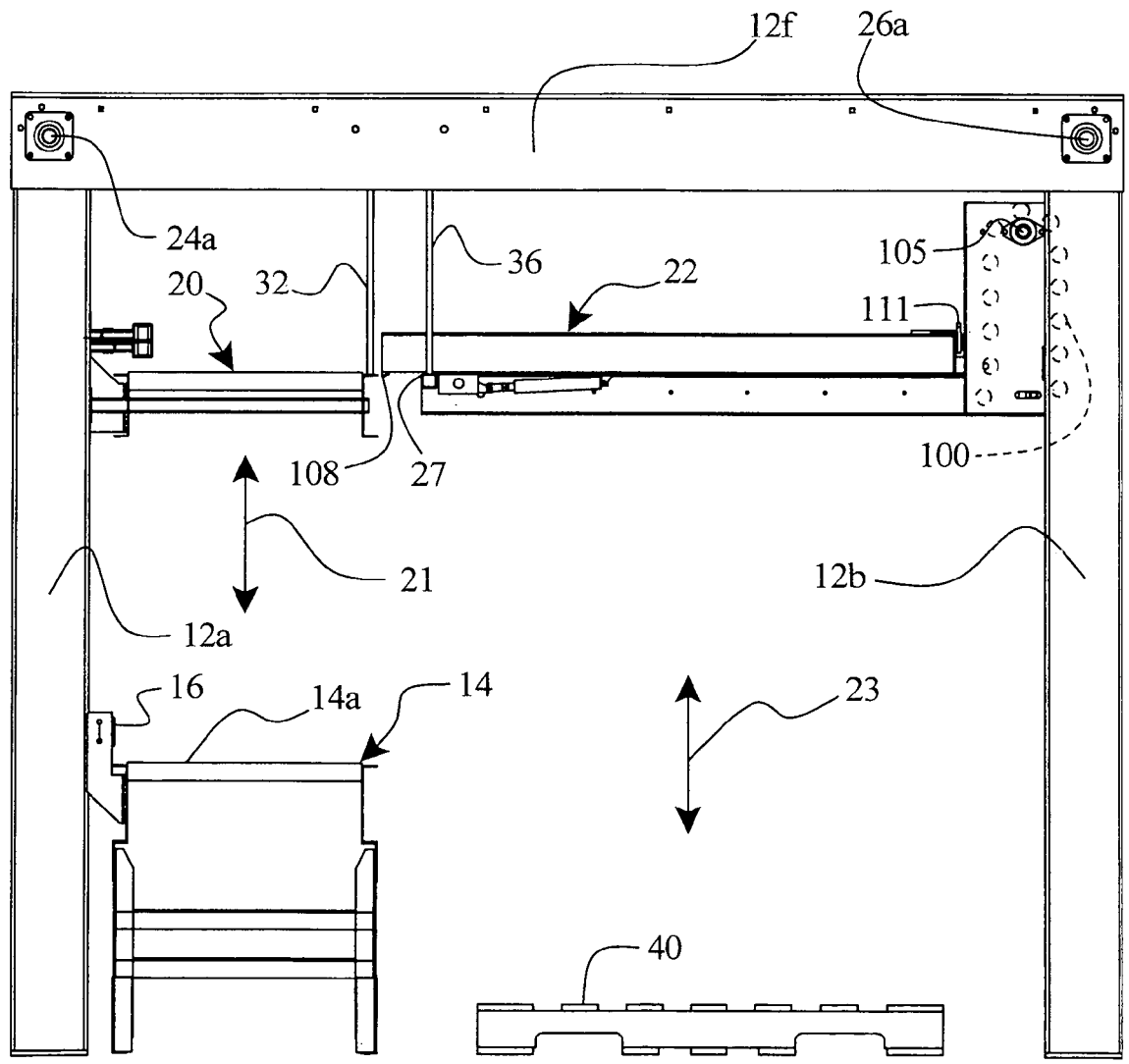
FIG. 2 illustrates in plan view the synchronized palletizer of FIG. 1 as taken along lines 2-2 of FIG. 1.

FIG. 1 illustrates in perspective and FIG. 2 in side view a palletizer 10. In FIGS. 1 and 2, palletizer 10 includes a frame 12 of generally box-form configuration. Frame 12 includes four vertical posts, individually posts 12a-12d, supporting an upper structure comprising horizontal beams 12e-12h. Thus, the lower end of each of posts 12a-12d rests on a floor and the upper ends of posts 12a-12d support beams 12e-12h. Beams 12e-12h provide a generally horizontal rectangular structure maintained at a given level above floor level. Generally, frame 12 provides a relatively compact overall structure supporting therein elements of palletizer 10 as described more fully hereafter.

Adjacent frame 12, palletizer 10 includes an infeed conveyor 14. Infeed conveyor 14 is a "production level" conveyor receiving, for example, output from a production or manufacturing operation or from a repackaging operation. Infeed conveyor 14 includes along its length a series of live, i.e., powered, rollers 14a. Infeed conveyor 14 also includes a case turner 16. Case turner 16 manipulates incoming items 18, e.g., cases of products, appropriately according to programmed layer building patterns. Use of case turner 16 and layer building methods and patterns are well known in the art.

Generally, infeed conveyor 14 moves a series of items 18 therealong for presentation to the remaining portions of palletizer 10 as operating within frame 12. As may be appreciated, infeed conveyor 14 and turner 16 operate cooperatively to appropriately orient a sequence of items 18 according to a programmed layer building pattern including contemplation of necessary sequential row patterns interfitting to form layer patterns and layer patterns interrelating to produce a stable stack of items on a pallet 40. Thus, it will be understood that items 18 are not necessarily symmetrical and may be oriented according to a specific predefined layer building pattern taking into account row-by-row variations within a layer and layer-to-layer variations for adjacent layers on a stack of item 18 layers resting on pallet 40.

Within frame 12, palletizer 10 includes a vertically reciprocating row conveyor 20 and a vertically reciprocating layer head 22. A row conveyor lift motor 24 when actuated vertically reciprocates conveyor 20 as indicated at reference numeral 21. A layer head motor 26 when actuated vertically reciprocates layer head 22 as indicated at reference numeral 23. Generally, each of row conveyor 20 and layer head 22 are independently suspended within frame 12. More particularly, row conveyor 20 hangs from four suspension points 25. Layer head 22 hangs from four suspension points 27. Each of conveyor 20 and layer head 22 carry a pair of guides 29. Each of vertical posts 12a-12d carry on their inner surface a corresponding guide track 31. Thus, guide tracks 31 on posts 12a and 12d interfit guides 25 of row conveyor 20 and maintain conveyor 20 along a vertical path within frame 12. Similarly, guide tracks 31 on vertical posts 12b and 12c interfit with guides 27 on layer head 22 to maintain layer head 22 along a vertical path within frame 12.

Suspension chains and associated sprockets couple each of row conveyor 20 and layer head 20 to the respective motors 24 and 26. More particularly, row conveyor 20 hangs within frame 20 from a first set of four suspension chains 32 routed through appropriate sprockets 34 and coupled to motor 24. Actuation of motor 24 in a first direction lowers row conveyor 20 and actuation in the opposite direction raises row conveyor 20. Specifically, the output shaft 24a of drive motor 24 extends the length of horizontal beam 12e (shown only partially in FIG. 1) and carries at each end a pair of sprockets 34a. Suspension chains 36 engage sprockets 34a and move in response to rotation of sprockets 34a. One end of each of chains 32 couples to a suspension point 25 and the other end of each of suspension chains 32 carries a counter weight (not shown) depending directly below each pair of sprockets 34a. In this manner, chains 32 remain engaged relative to sprockets 34a and, therefore, relative to drive motor 24.

Similarly, a second set of four suspension chains 36 and sprockets 38 suspend layer head 22 within frame 12 and couple to motor 26. Actuation of motor 26 in a first direction moves layer head 22 upward and actuation in the opposite direction lowers layer head 22. Specifically, the output shaft 26a of drive motor 26 extends the length of horizontal beam 12g (shown only partially in FIG. 1) and carries at each end a pair of sprockets 38a. Suspension chains 36 engage sprockets 38a and move in response to rotation of sprockets 38a. One end of each of chains 36 couples to a suspension point 27 and the other end of each of suspension chains 36 carries a counter weight (not shown) depending directly below each pair of sprockets 38a. In this manner, chains 36 remain engaged relative to sprockets 38a and, therefore, relative to drive motor 26.

Thus, row conveyor 20 and layer head 22 operate independently and may be vertically positioned by appropriately actuating and controlling motors 24 and 26, respectively.

Row conveyor 20 moves to a lower position vertically coincident with the height of infeed conveyor 14 to receive from infeed conveyor 14 one or more rows of items 18. As discussed above, the items 18 presented to row conveyor 20 at the output of conveyor 14 correspond to an ongoing layer building pattern, i.e., particular ones of the items 18 within a given row are suitably oriented according to and overall sequence of item 18 orientation pattern. As live rollers 14a propel a sequence of items 18 onto row conveyor 20, live rollers 20a activate and collect the sequence of items 18 as a row or rows onto conveyor 20. As may be appreciated, live rollers 20a are suitably operated in coordination with live rollers 14a of conveyor 14 to pass serially a given set of items 18 from conveyor 14 onto conveyor 20. In this manner, conveyor 20 receives items 18 from conveyor 14. Conveyor 20 is then vertically positioned as necessary to vertically coincide with a current height of layer head 22 to pass items 18 from conveyor 20 to layer head 22.

As may be appreciated, because both row conveyor 20 and layer head 22 independently vertically reciprocate a broad combination of relative movements may be accomplished by programmed control to transfer items 18 from conveyor 20 to layer head 22, i.e., one of the two devices may be moved to match the height of the other or both moved to match some intermediate or predetermined height according to programmed control. Generally, however, it is contemplated that the relatively higher speed conveyer 20 "chase' layer head 22, i.e., seek out a current height for layer head 22, when transferring items 18 from conveyor 20 onto layer head 22. In this particular embodiment, conveyor 20 includes a row pusher 30 of generally conventional design including a pneumatic cylinder 30a for pushing a row of items 18 from conveyor 20 onto layer head 22. Thus, row conveyor 20 vertically aligns itself with a current vertical position of layer head 22 and passes laterally items 18 from conveyor 20 to layer head 22.

Generally, layer head 22 tracks the height of a stack of items 18 layer as positioned on a pallet 40. Pallet 40 rests at floor level and receives layer-by-layer items 18 from layer head 22. Once a complete layer of items 18 has been built on layer head 22, layer head 22 deposits the entire layer as a next layer on pallet 40 or on a stack of layers resting on pallet 40. As will be described more fully hereafter, layer head 22 withdraws its support from below a layer of items 18 and drops the layer onto a pallet 40 below or onto a stack of item 18 layers resting on pallet 40 below. Layer head 22 then repositions itself, i.e., raises, to prepare to receive a next item 18 layer from row conveyor 20.

Figure 3:
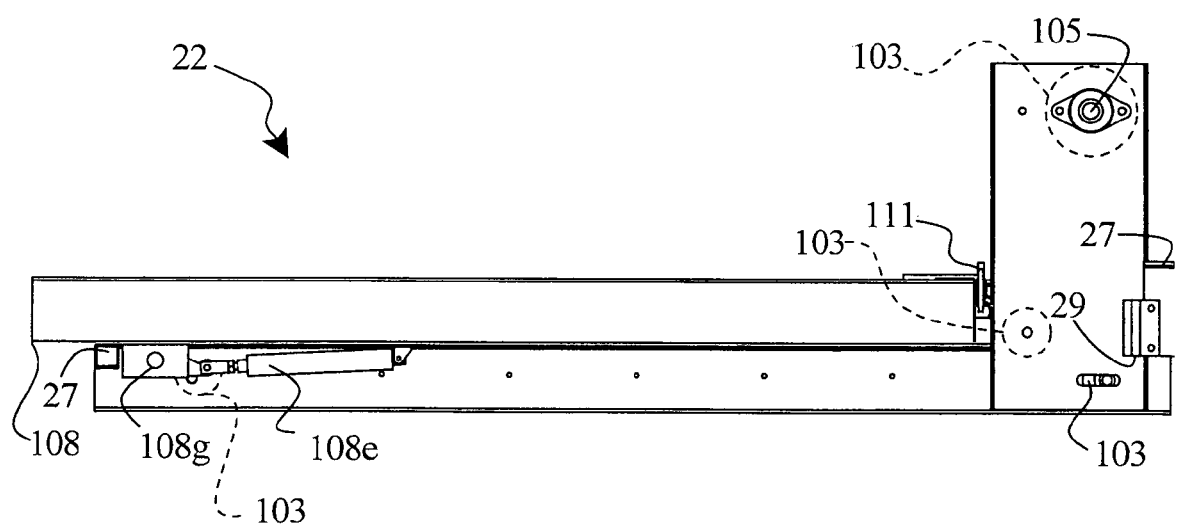
FIG. 3 illustrates in side view a layer head of the palletizer of FIG. 1.
Figure 4:
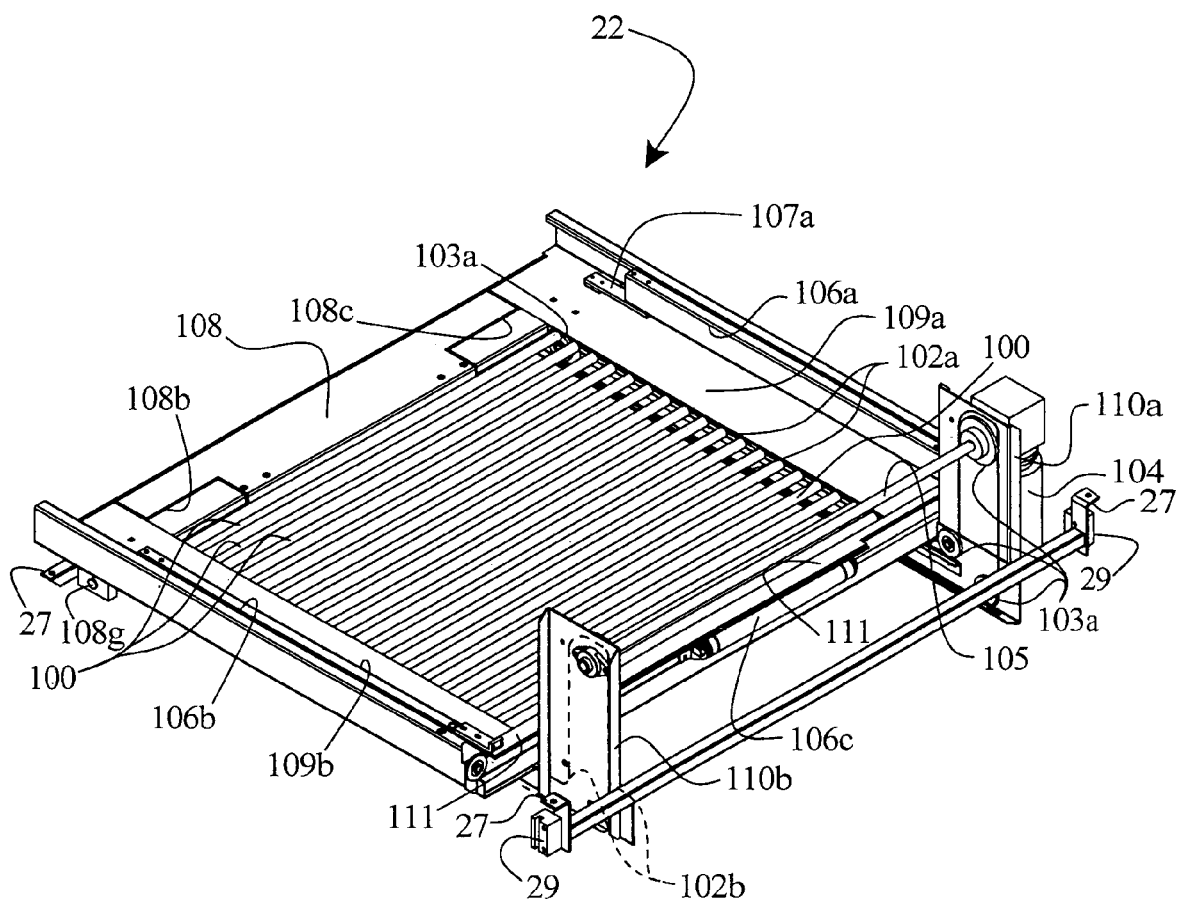
FIG. 4 illustrates in perspective the layer head of FIG. 3.
Figure 5:
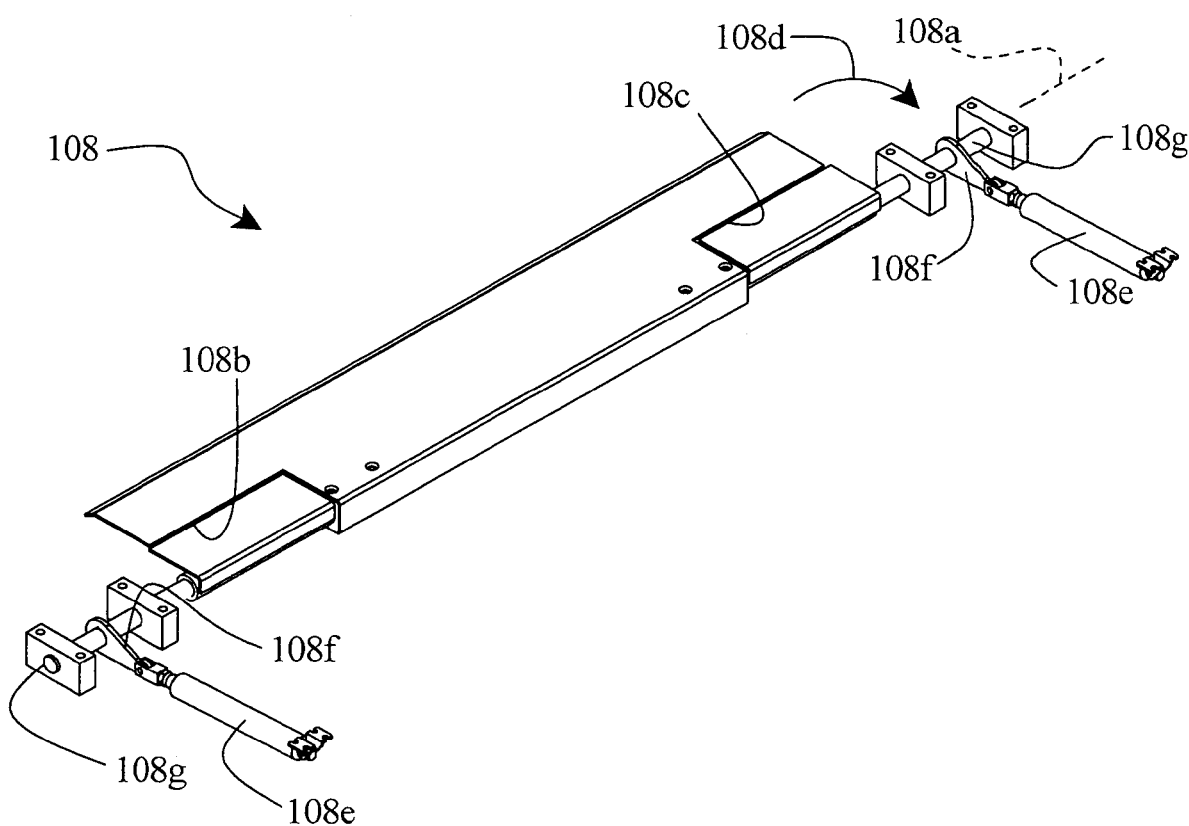
FIG. 5 illustrates in perspective a dead plate of the layer head of FIGS. 3 and 4.

FIGS. 3 and 4 detail layer head 22 as detached from frame 12. FIG. 5 illustrates a dead plate 108 of layer head 22, but detached therefrom for purposes of illustration. In FIGS. 3-5, layer head 22 includes a set of free rollers 100 carried on a pair of chains 102a and 102b. Sprockets 103a constrain chain 102a to an L-shaped path. Similarly, sprockets 103b restrict chain 102b to a corresponding L-shaped path. Rollers 100 attach to a length segment of chain 102a and thereby create a removable floor relative to layer head 22. A drive shaft 105 couples to one of sprockets 103a and one of sprockets 103b and thereby ties together chains 102a and 102b. Drive motor 104 turns shaft 105 to move chains 102a and 102b along their respective and coordinated L-shaped paths. A pair of vertical plates 110, individually 110a and 110b, support shaft 105 and also carry thereacross a stop 111, i.e., a raised edge formation. Stop 111 engages a leading lower edge of an item 18 layer while being dropped from layer head 22.

Floor drive motor 104 operates to move chains 102 and thereby withdraw rollers 100 from a supporting or floor position relative to an item 18 layer to an open position allowing an item 18 layer to drop through layer head 22 onto a pallet 40 therebelow or onto a stack of item 18 layers therebelow. Advancing rollers 100 rightward, in the view of FIGS. 3 and 4, moves rollers 100 out of a floor position as illustrated in FIG. 4 and into an open position occupying the vertical portion of the L-shaped path provided by sprockets 103 and chains 102. Once the leading edge of the item 18 layer engages stop 111, the item 18 layer holds its position and rollers 100 continue to move out from thereunder to drop the item 18 layer therebelow. The first row of items 18 to fall from layer head 22 is the row most distant from stop 111. Thus, the first-to-arrive row of items 18, i.e., the row first placed on layer head 22 when constructing a layer, is the last row to fall from layer head 22 when releasing an item 18 layer. The last-to-arrive row is, therefore, the first row dropped from layer head 22. In this manner, a complete item 18 layer drops through the opened floor of layer head 22.

Layer head 22 includes conditioning mechanisms to better organize a given item 18 layer thereon prior to dropping the layer on a pallet 40 or a stack of layers therebelow. As discussed above, palletizer 10 accommodates an ongoing layer building pattern. Items 18 of varying orientation must be organized into a layer. A relatively loose, i.e., with space therebetween, initial organization of items 18 better facilitates layer building patterns. Thus, as initially organized on layer head 22, items 18 are loosely packed but possess the required relative orientations to form, when brought together, a desired and compact overall item 18 configuration within a given layer. Generally, layer head 22 includes conditioning mechanisms to collapse together along orthogonal dimensions a loosely packed item 18 layer into a tightly packed item 18 layer.

A pair of side clamps 106, individually 106a and 106b, move laterally inward in a first dimension and compress together an item 18 layer in preparation for deposit on a stack of item 18 layers therebelow. A pneumatic cylinder 106c couples by way of scissor mechanism 107 (shown partially at reference numeral 107a in FIG. 4) to operate clamps 106a and 106b in parallel, i.e., move laterally inward in parallel and coordinated orientation. A dead plate 108 (shown separately in FIG. 5) rotates about an axis 108a, i.e. flips up into and past a vertical position, to compress a layer of items in a second dimension. Thus, operating side clamps 106 and pivoting dead plate 108 compresses together, in first and second mutually orthogonal dimensions, a layer of items 18 prior to deposit on a surface therebelow. Thus, the process of building a layer row-by-row on lift head 22 results in some disorganization or loose fitting layers requiring, for optimal stacking, that the layers be compressed together in two dimensions, i.e. squeezed inward by bars 106 and plate 108, to make a compact organized layer ready for stacking on a surface therebelow.

In fact, a palletizer which permits significant disorganization in an item 18 layer while constructing such layer row-by-row promotes rapid construction of the layer. For example, certain layer building patterns require an interfitting relationship between rows within a layer. When such interfitting is required, it is easier and faster to initially form the layer as a loose organization of items 18 to better facilitate rows having items 18 interfitting with other rows.

Palletizer 10 facilitates such loose organization of a layer of items 18 during construction thereof at upward-facing side plates 109a and 109b. Generally, side plates 109 are upward facing, smooth surfaces adjacent the ends of rollers 100 on each side of layer head 22. Rollers 100 are of sufficient length to support a tightly-packed item 18 layer thereon. Rollers 100 need not be any wider than necessary to support an item 18 layer thereon by virtue of support at side plates 109a and 109b. More particularly, a loosely fitting item 18 layer occupies more area, i.e., requires a greater support surface, than a tight-fitting item 18 layer. Side plates 109a and 109b support the outer edges of a loosely-fitting item 18 layer and thereby provide a greater area for supporting an item 18 layer during construction. In other words, layer head 22 tolerates significant disorganization among layers during layer formation and thereby facilitates rapid layer construction on layer head 22.

Once the layer has been loosely organized on the upward facing surfaces of layer head 22, i.e., on rollers 100 and side plates 109a and 109b, dead plate 108 and side clamps 106 operate to drive together and compress the loosely organized item 18 layer into a tightly fitting item 18 layer resting entirely on rollers 100.

As best seen in FIG. 4, the length of dead plate 108 corresponds to the length of rollers 100. Dead plate 108 includes, at each end, notches 108b and 108c, respectively. When plate 108 pivots upward, as indicated at reference numeral 108d in FIG. 5, notches 108b and 108c leave an open space therebelow to accommodate inward movement of clamps 106, i.e., inward and past the ends of dead plate 108. With dead plate 108 moved to its "clamping" position, i.e., pivoted inward to engage and compress and item 18 layer resting on layer head 22, side clamps 106 move inward and if necessary reach beyond the ends of rollers 100 to thereby compress together in coordination with dead plate 108 an entire item 18 layer from a loosely organized item 18 layer into a tightly-fitting item 18 layer. As may be appreciated stop 111 operates in coordination with clamps 106 and dead plate 108 to compress together an item 18 layer resting upon layer head 22. More particularly, stop 111 resists movement of an item 18 layer in response to dead plate 108 pivoting into its clamping position.

In FIG. 5, a pivot shaft 108g mounts rotatably to layer head 22 and carries thereon dead plate 108. A pair of pneumatic cylinders 108e couple by way of corresponding levers 108f to pivot shaft 108g. Thus, actuation of cylinders 108e causes movement of dead plate 108 between a transition position as shown in FIGS. 4 and 5 and a clamping position, i.e., pivoted inward as indicated at reference numeral 108g.

Thus, dead plate 108, rollers 100, side plates 109, stop 111 and side clamps 106 cooperatively tolerate significantly loose organization among items 18 when forming an item 18 layer and compress together items 18 in a tight fitting layer supported entirely on rollers 100.

Dead plate 108 provides a transition surface filling a gap between row conveyor 20 and layer head 22. Conventional dead plates, i.e., transition devices, are generally fixed in position. Dead plate 100 goes beyond a transition function and provides a compression function. The horizontal position of dead plate 108 provides, therefore, a transition surface function when item 18 rows are pushed onto layer head 22. After the last-to-arrive row of items 18 is located on layer head 22, dead plate 108 pivots up to compress and provide a secondary backstop for proper layer construction. Plate 108 thereby provides an ability to lower into a generally horizontal conventional dead plate position for a net fit between a reciprocating layer head 22 and whatever it mates with for receiving rows, e.g., a row conveyor 20. Pivoting dead plate 108 provides also a layer compression device which operates in opposition to stop 111 as provided across plates 110. In other words, dead plate 108 can push a layer against the stop 111 and thereby squeeze or compress the layer between plate 108 and stop 111.

Dead plate 108 provides a particularly important advantage during layer release, i.e., when rollers 100 are pulled from under an item 18 layer to drop the item 18 layer through layer head 22. As discussed above, dead plate 108 pivots into clamping or compressing engagement relative to an item 18 layer to better organize and make compact the item 18 layer in preparation for stacking. Leaving dead plate 108 in such engagement improves release of the first row of items dropped through layer head 22. More particularly, and especially with respect to smaller dimensioned items 18, dead plate 108 maintains a given and desired position for a row of items 18 when it remains in contact with the row of items 18 as they fall from of rollers 100 and onto a supporting surface therebelow. By guiding this first-to-drop row of items 18, dead plate 108 serves an additional guiding function relative to items 18 when releasing a row of items 18 from layer head 22. This first-to-drop row of items 18 then serves a similar guiding function relative to a next-to-drop row of items 18. Eventually, the last-to-drop row of items 18, i.e., those adjacent stop 111, fall through layer head 22 and find their final resting position on pallet 40 or on a stack of item 18 layers resting on pallet 40.

Prior art roller floors pulling support from under a layer of items suffer from a "loose" row which becomes more troublesome for narrower item 18 dimensions. In other words, the narrower item 18 is the greater its tendency to rock out of position when falling from rollers 100. In accordance with the present invention, however, dead plate 108 guides the first-to-drop item 18 row into position and begins a cascading series of supporting elements, i.e., each row is guided into position by the previous row and the first row is guided into position by dead plate 108. In this manner, an item 18 layer compressed together on layer head 22 achieves a more stable and better compressed final position after dropping through layer head 22 as it finds its final resting place on pallet 40 or on a stack of item 18 layers resting on pallet 40.

Compressive forces applied to an item 18 layer by virtue of the item 18 layer being captured and compressed between dead plate 108 and stop 111 also eliminate a dependence on conventional and undesirably variable compressive forces supplied by roller floors. In systems using only free rollers pulled from under an item 18 layer, the compressive force, i.e., against a fixed stop, varies as the roller bearings become more free turning by the unweighting thereof as items 18 fall therefrom. For particularly heavy items 18 and particularly free turning rollers 100, moving rollers 100 out of a supporting position does not generate significant compressive forces relative to a load, i.e., the load does not bear heavily against a fixed stop under such conditions. Under the present invention, however, dead plate 108 maintains static compression relative to an item 18 layer regardless of item 18 layer weight and degree of free-turning characteristic of rollers 100. As a result, an item 18 layer dropped through layer head 22 enjoys a more compact and better organized final resting place on pallet 40 or on a stack of item 18 layers resting on pallet 40.

Side plates 109 enhance use of rollers as a floor for a layer conveyor. The span occupied by rollers 100, i.e., as supported at each end thereof at chains 102, is limited by the strength and deflection characteristics of rollers 100. As may be appreciated, minimizing the length of rollers 100 to occupy just sufficient distance to support an entire item 18 layer minimizes the cost and structural requirements of rollers 100. Side plates 109 tolerate loose organization within an item 18 layer during construction thereof. In conventional practice, a forty inch wide finished width for a given item 18 layer requires a roller floor of over fifty inches wide to accommodate the layer during construction. Under the present invention, however, rollers 100 need only be forty inches wide because side plates 109 support the outer edges of a layer during construction thereof. As the roller floor, i.e., the support provided by rollers 100, width increases, the strength of the rollers must increase to avoid unacceptable deflection caused by the longer roller length. Increased strength requires increased weight and requires larger diameter rollers 100 as flooring for layer head 22. Both aspects negatively and inefficiently affect machine performance when roller length exceeds item 18 layer dimensions. In accordance with the present invention, however, rollers 100 are of minimal length just sufficient to support a tightly-organized item 18 layer thereon.

Thus, a synchronized palletizer has been shown and described. The synchronized palletizer provides a compact overall size with high item throughput. Most low infeed, i.e., production level infeed, palletizers require a pallet position, a layer build position, and a row build conveyor. The layer build position is essentially eliminated by building layers on the layer head 22 which also serves also as a layer placement mechanism, i.e., placing item 18 layers on a pallet 40 or stack of item 18 layers. This feature is believed to save approximately 25% to 35% of otherwise required floor space. The synchronized palletizer utilizes a relatively high speed row conveyor to chase down a current position of the layer head 22. Generally, conventional layer building brings each row to a fixed and maximum height, i.e., above any potential height for a stack of item 18 layers, for each and every row. Each row need only be raised to the height of the current stack level, i.e., to where layer head 22 is positioned just above pallet 40 or a stack of item 18 layers resting on pallet 40. In this manner, the synchronized palletizer reduces travel distance and travel time for items conveyed to a layer building site.

While illustrated as having two side plates 109, one at each end of rollers 100, the synchronized palletizer may be operated with only one side plate 109. The presence of a support area beyond rollers 100 and adjacent thereto facilitates loose packing of item 18 rows during construction of an item 18 layer on layer head 22.

As discussed above, dead plate 108 provides both a compression function and a guiding function. With respect to compression, dead plate 108 engages an item 18 layer and brings together or compresses the layer. With respect to its guiding function, dead plate 108 maintains contact with the first-to-drop row of items 18 thereby preventing tipping of the items as the rollers 100 move out from underneath. As discussed hereafter, a back clamp assembly 210 also provides the dual functions of compression and guiding during release of items from a layer head.

Figure 6:
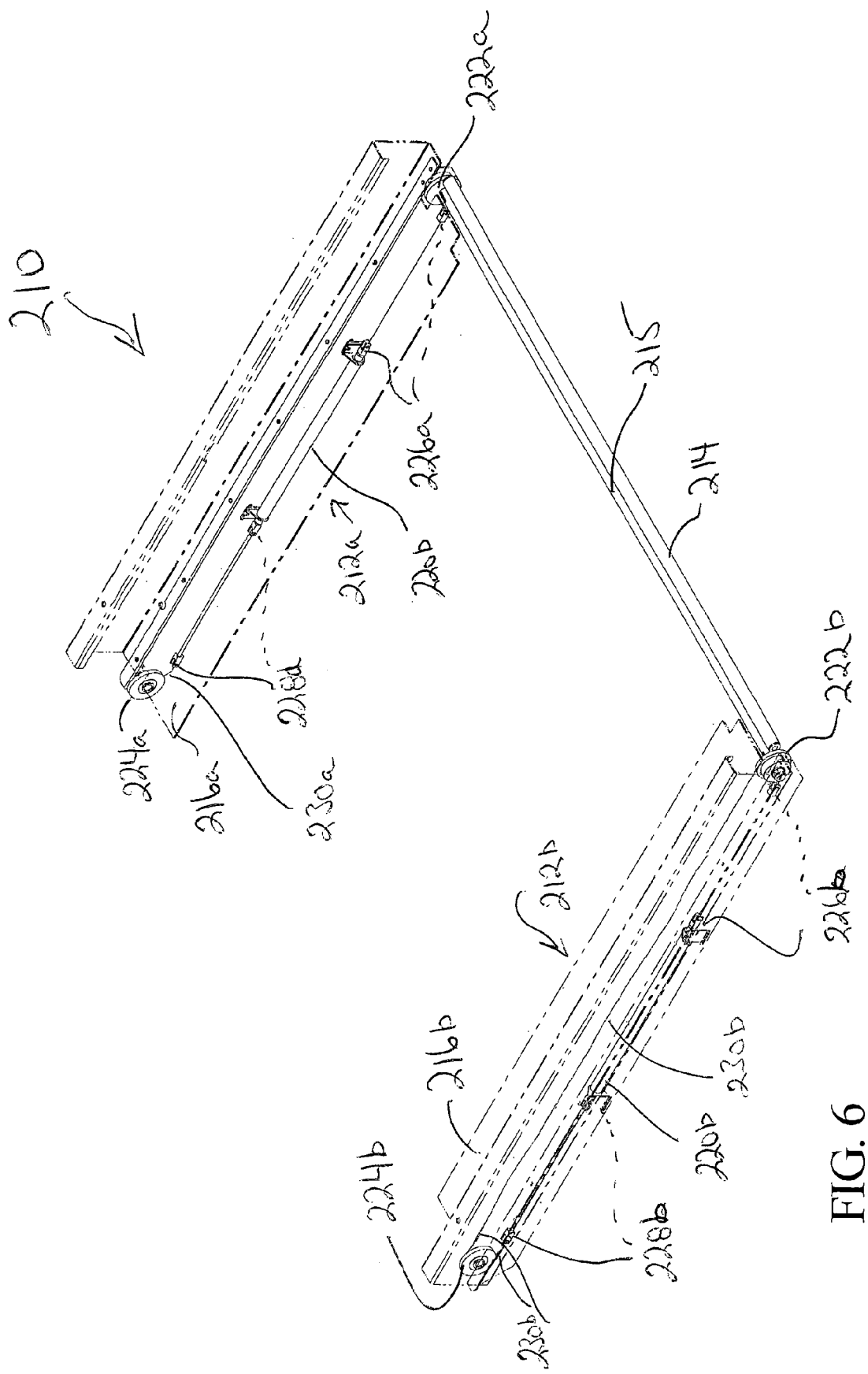
FIG. 6 illustrates separately a submerged bar clamp operating as an alternative to the dead plate of FIGS. 3-5.

FIG. 6 separately illustrates back clamp assembly 210 according to an embodiment of the present invention. In FIG. 6, back clamp assembly 210 includes a left drive 212a, a right drive 212b, and a back clamp bar 214. Each of left drive 212a and right drive 212b couples to clamp bar 214 for reciprocating movement thereof. A synchronizing drive shaft 215 also couples together left drive 212a and right drive 212b for coordinated movement thereof. Generally, drives 212a and 212b pull clamp bar 214 up from a submerged position, across an item layer building area, and return clamp bar 214 to the submerged position. A left side plate 216a and right side plate 216b in FIG. 6 are coincident with a layer building surface 217 supporting a layer 282 of items 284 resting on a layer head 280. Drives 212a and 212b bring clamp bar 214 from below side plates 216a and 216b upward and toward a layer 282 of items 284 as described more fully hereafter. For the present discussion, it will be understood that drives 212a and 212b each mount upon layer head 280 and side plates 216a and 216b form a portion of the layer building surface 217 provided by layer head 280 (FIGS. 7-10).

Layer head 280 corresponds generally to layer head 22 as described above. Layer head 280, however, includes back clamp assembly 210 as described hereafter in place of dead plate 108. Back clamp assembly 210 provides the dual functions of compression and guiding as described above with respect to that provided by dead plate 108. Accordingly, layer head 280 will not be described in full detail, it being understood that layer head 280 is generally similar to layer head 22 in its structure and operation, with the exception that layer head 280 includes back clamp assembly 210 in place of dead plate 108.

Thus, layer head 280 operates within the context of a palletizing operation wherein successive layers 282 are constructed upon layer head 280 and deposited upon a pallet or stack of layers 282 therebelow. In other words, layers 282 are constructed upon layer head 280 and are dropped through a retractable floor of layer head 280 for deposit upon a pallet or stack of layers therebelow.

Left drive 212a includes a double-ended pneumatic cylinder 220a. Left drive 212a includes a forward pulley 222a and a rearward pulley 224a. A forward coupler 226a of pneumatic cylinder 220a couples to a first end of cable 230a. A rearward coupler 228a ties to the other end of cable 230a. Cable 230a routes from coupler 226a around pulley 222a and rearward around pulley 224a to its connection with coupler 228a. In FIG. 6, coupler 228a is shown in both its retracted and extended positions while coupler 226a is shown only in its retracted position. It will be understood, however, that during operation of pneumatic cylinder 220a couplers 226a and 228a remain a fixed distance apart while reciprocally moving cable 230a.

Right drive 212b includes a similar arrangement. More particularly, right drive 212b includes a pneumatic cylinder 220b with couplers 226b and 228b each tied to respective ends of a cable 230b. Cable 230b engages pulleys 222b and 224b.

With respect to cables 230a and 230b, while illustrated schematically herein as cables it will be understood that a variety of devices may be employed to move clamp bar 214. For example, drive belts, chains, and other such devices may be used in conjunction with pulleys 222a, 222b, 224a, and 224b to carry clamp bar 214 along the path described and illustrated herein. In addition to pulleys and such devices as drive belts, chains, and the like, it will be understood that a variety of mechanical architectures may be employed to move a clamp bar from a submerged position into an operating position as described herein. Accordingly, the present invention and any embodiments thereof will not be limited to the specific cable illustrated and described herein but will be taken to include other such devices capable of carrying clamp bar 214 as described herein.

Thus, when operated in unison pneumatic cylinders 220a and 220b reciprocate cables 230a and 230b together through forward and rearward motion. Synchronizing drive shaft 215 ties together pulleys 222a and 222b and thereby unifies movement of cables 230a and 230b. In other words, by virtue of synchronizing drive shaft 215 clamp bar 214 maintains a given orientation within lift head 280. More particularly, clamp bar 214 remains parallel to the front and rear edges of layer head 280. Clamp bar 214 couples to cables 230a and 230b. Thus, clamp bar 214 follows cables 230a and 230b. With this arrangement, clamp bar 214 may be positioned below side plates 216a and 216b as illustrated in FIG. 6. Activating pneumatic cylinders 220a and 220b moves cables 230a and 230b rearward, i.e., from pulleys 222a and 222b toward pulleys 224a and 224b. This causes back clamp bar 214 to move initially and rotationally along the periphery of pulleys 222a and 222b and thereafter linearly rearward toward pulleys 224a and 224b. As a result, back clamp bar 214 first resides below side plates 216a and 216b, but may be brought up and out of this submerged position and to move linearly and parallel to, but above, side plates 216a and 216b.

Figure 7:
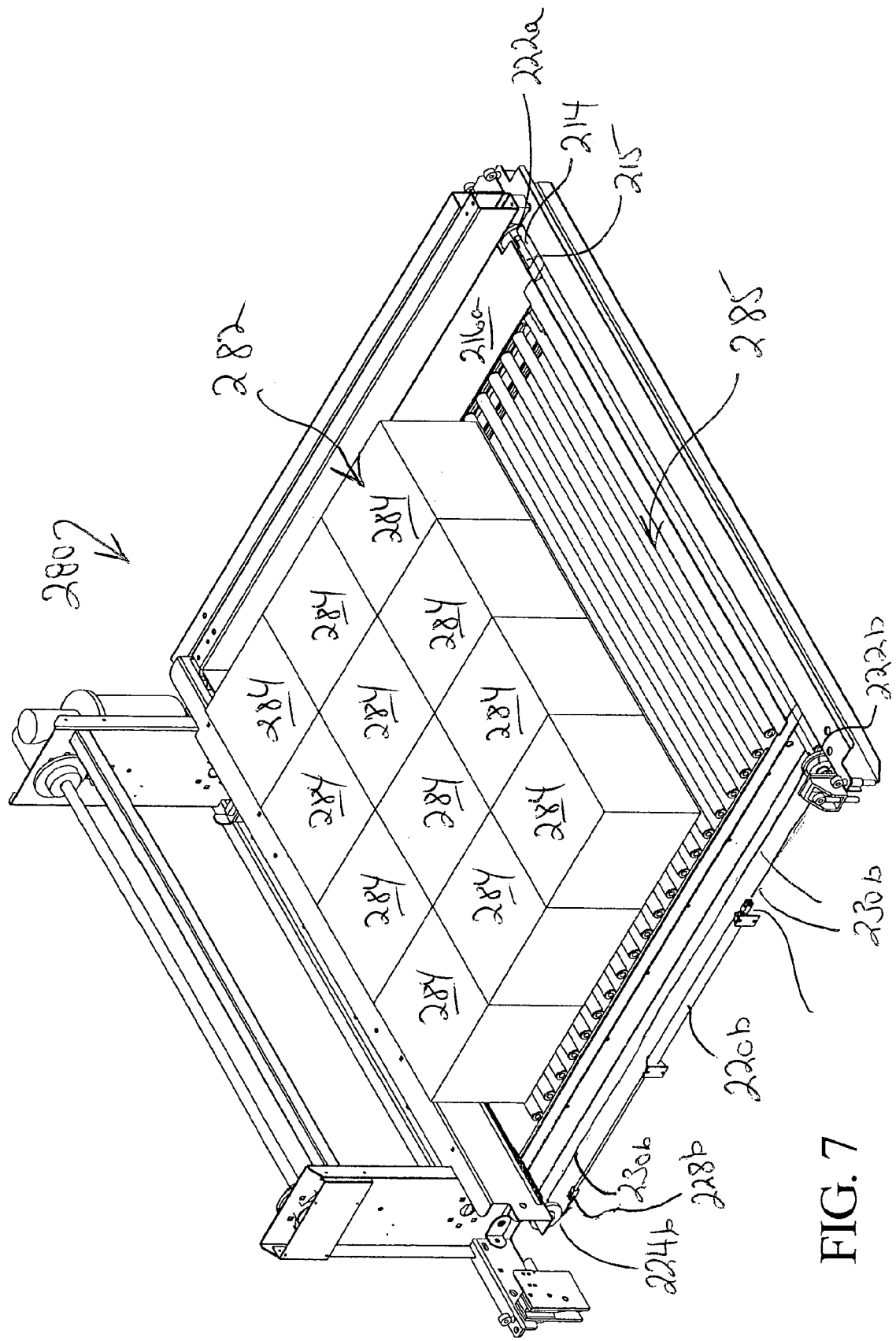
FIGS. 7-10 illustrate the submerged bar clamp of FIG. 6 as integrated into a layer head.
Figure 8:
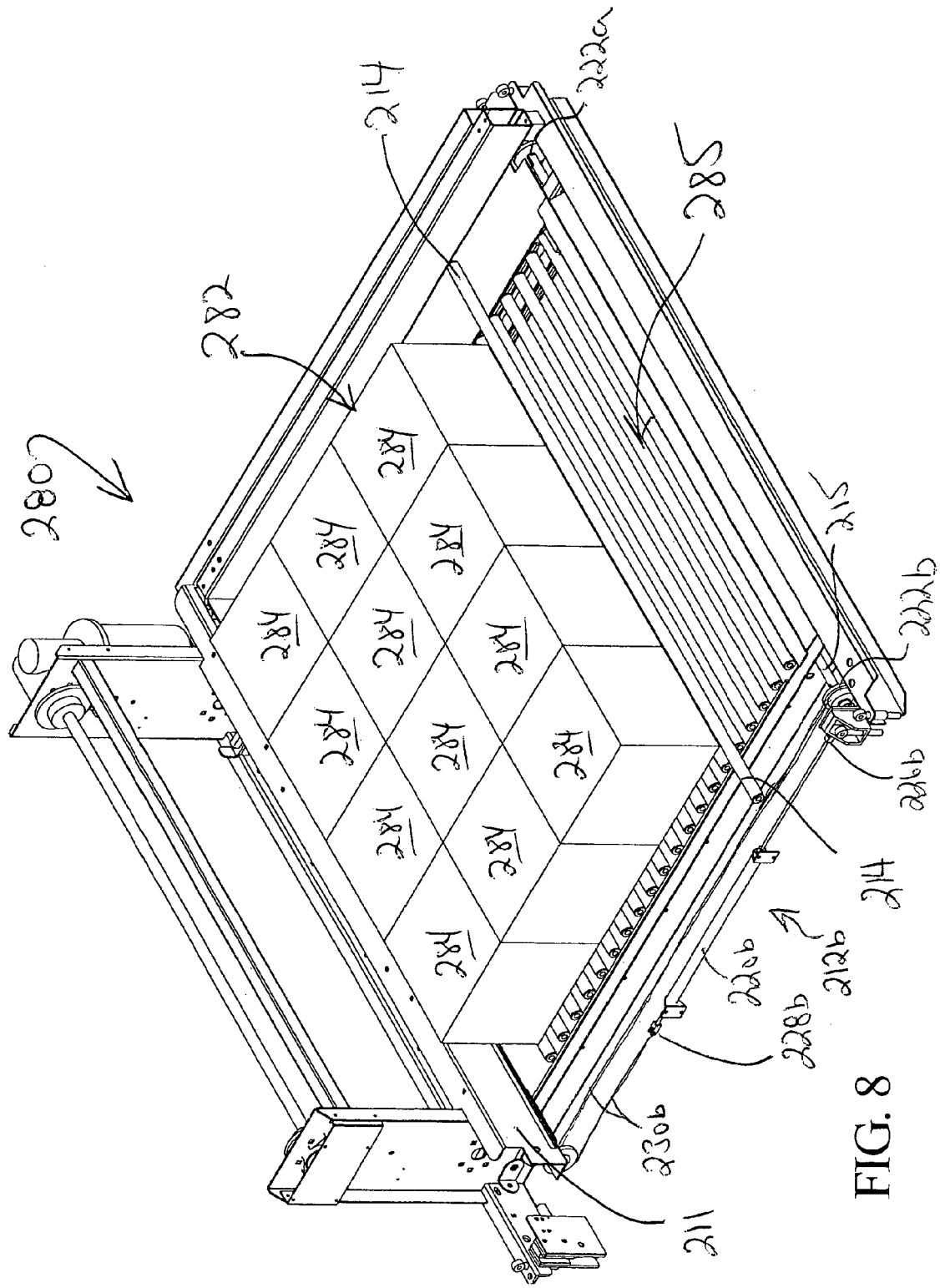

FIGS. 7 and 8 illustrate back clamp assembly 210 as integrated into lift head 280. Portions of lift head 280 in the vicinity of right drive 212b are omitted to better show portions of back clamp assembly 210. In FIG. 7, drives 212a and 212b have been activated, i.e., pneumatic cylinders 220a and 220b driven rearward, to position clamp bar 214 most forward and in its submerged position below side plates 216a and 216b (side plate 216b being omitted from FIG. 7). FIG. 8 illustrates back clamp assembly 210 with pneumatic cylinders 220a and 220b driven forward to bring clamp bar 214 up from its submerged position and forward along side plates 216a and 216b (side plate 216b being omitted from FIG. 8). FIGS. 7 and 8 also illustrate a layer 282 of individual items 284. Layer 282 may be constructed or formed upon layer head 280 by pushing or pulling rows of items 284 onto layer head 280. In FIG. 7, with clamp bar 214 in its submerged position below side plates 216a and 216b, items 284 may be pulled or pushed onto layer head 280 directly over clamp bar 214. In other words, bar 214 does not obstruct passage of items 284 thereover. Once a layer has been formed on layer head 280, back clamp assembly 210 may be activated and brought to the position illustrated in FIG. 8 and thereby engage item layer 282.

Figure 9:
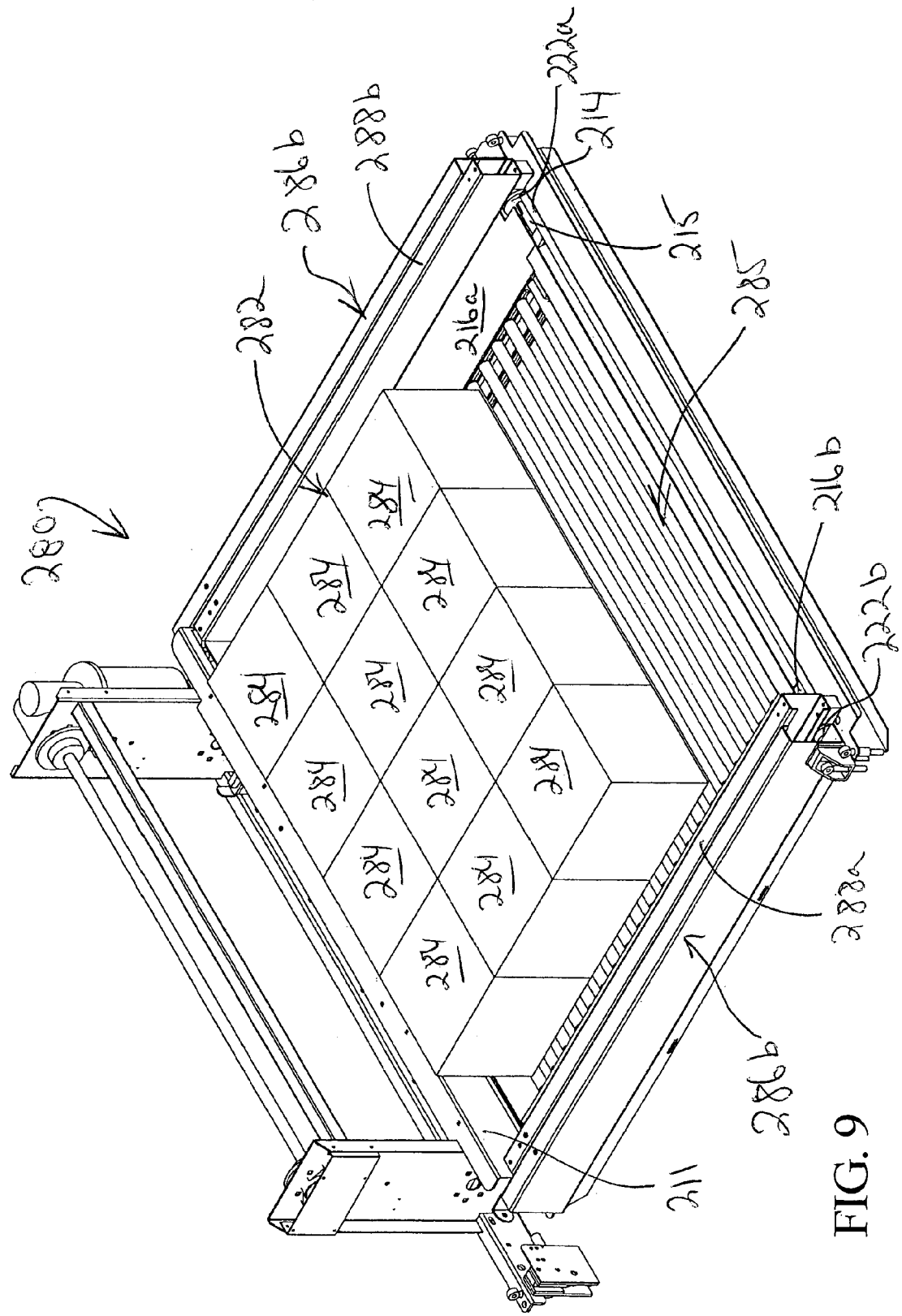

FIG. 9 illustrates layer head 280 with a layer 282 thereon. In the view of FIG. 9, most of back clamp assembly 210 is obscured, however, clamp bar 214 may be seen in its submerged position below side plates 216a and 216b. Layer 282 has been brought onto layer head 280 by, for example, pushing or pulling items 284 onto a roller floor 285 and side plates 216a and 216b. As described more fully hereafter, roller floor 285 retracts from below layer 282 and thereby drops layer 282 through layer head 280 for deposit therebelow upon a pallet or stack of layers 282.

After a complete layer 282 has been formed upon layer head 280, left side clamp 286a and right side clamp 286b are activated to laterally collapse layer 280, i.e., push layer 280 off of side plates 216a and 216b and inward wholly onto roller floor 285. Each of side clamps 286a and 286b include a clamp bar 288a and 288b, respectively. In the particular embodiment illustrated herein, clamp bars 288a and 288b extend laterally inward and toward one another by means of scissor bars 290a and 290b, respectively. Each bar 288a and 288b is supported at each end thereof by a block 292. The lower edge of each bar 288a and 288b is thereby spaced vertically above roller floor 285 and above side plates 216a and 216b sufficient distance to allow passage of clamp bar 214 therebetween. In other words, bars 288a and 288b operate sufficiently above side plate 216a and 216b and roller floor 285 whereby clamp bar 214 may be brought out of its submerged position and into engagement with layer 282 without interference from side clamps 286a and 286b. In some embodiments, clamp bar 214 can slide directly upon the upward-facing surface of side plates 216a and 216b. Accordingly, operation of clamp bar 214 and operation of side clamps 286a and 286b can occur without interference therebetween.

Figure 10:
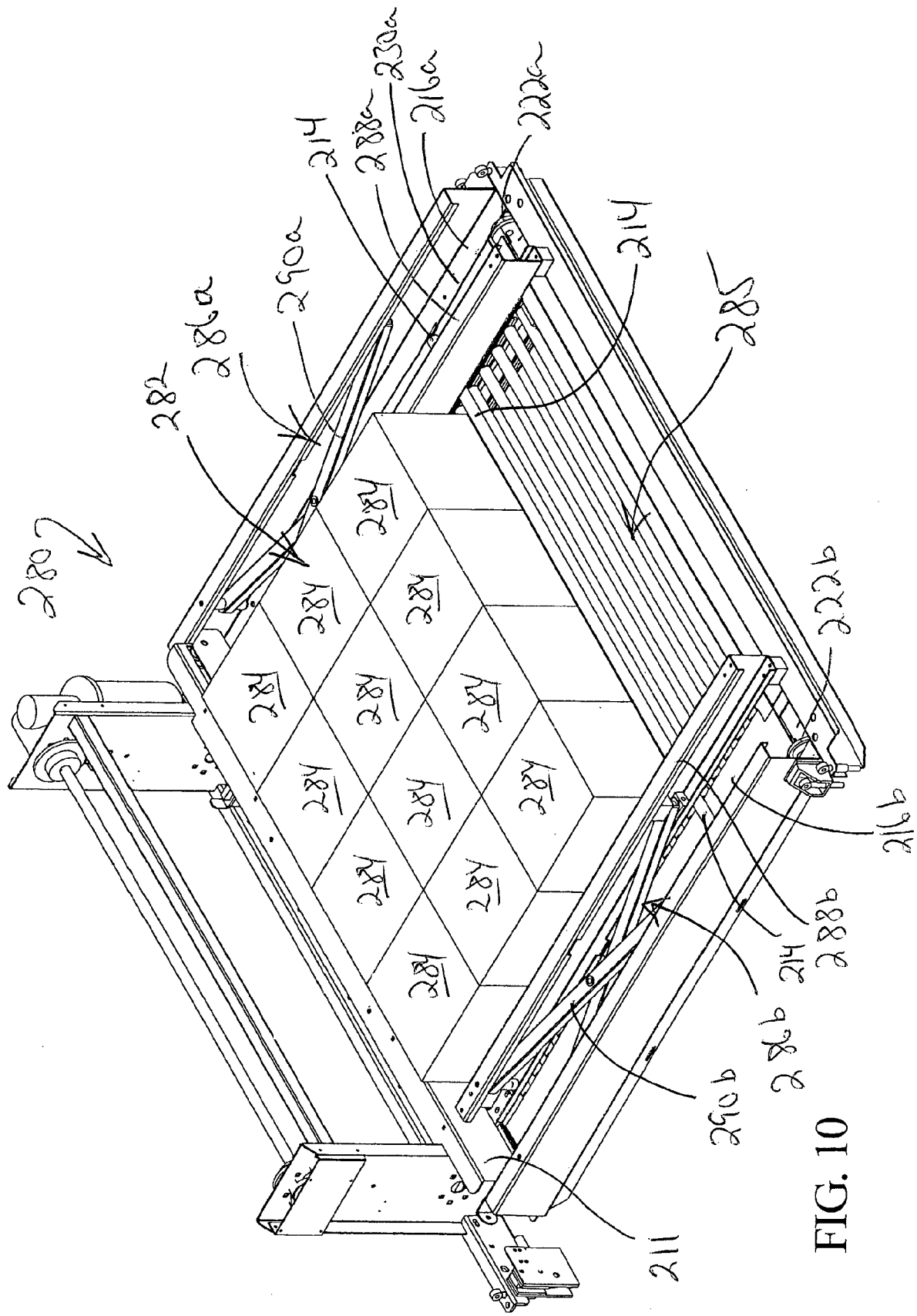

In FIG. 10, clamp bar 214 has been brought out of its submerged position and into engagement with layer 282 while side clamps 286a and 286b are extended laterally inward without interference therebetween. In this respect, clamp bar 214 serves its compression function by operating in conjunction with side clamps 286a and 286b and with stop 211 to compress together laterally and longitudinally inward the items 84 to form a well organized layer 282.

Figure 11:
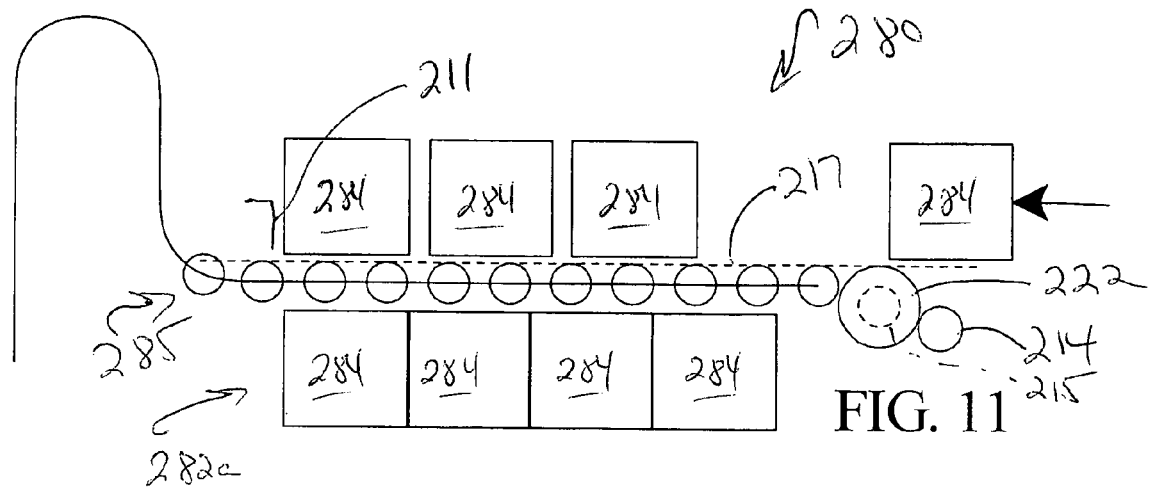
FIGS. 11-16 illustrate schematically operation of a layer head and the submerged bar clamp of FIGS. 6-10.

FIGS. 11-16 illustrated schematically the operation of layer head 280 including clamp bar 214 as described herein. In FIG. 11, a first layer 282a resides directly below layer head 280. In other words, earlier palletizing operations formed and deposited layer 282a upon another layer 282 or a pallet (not shown). Layer head 280 is then positioned just above layer 282a to form a next layer 282b of items 284. The roller floor 285 together with side plates 216 define the layer building surface 217. Clamp bar 214 resides below layer building surface 217 and items 284 are pushed or pulled onto surface 217, as indicated at reference numeral 300.

Figure 12:
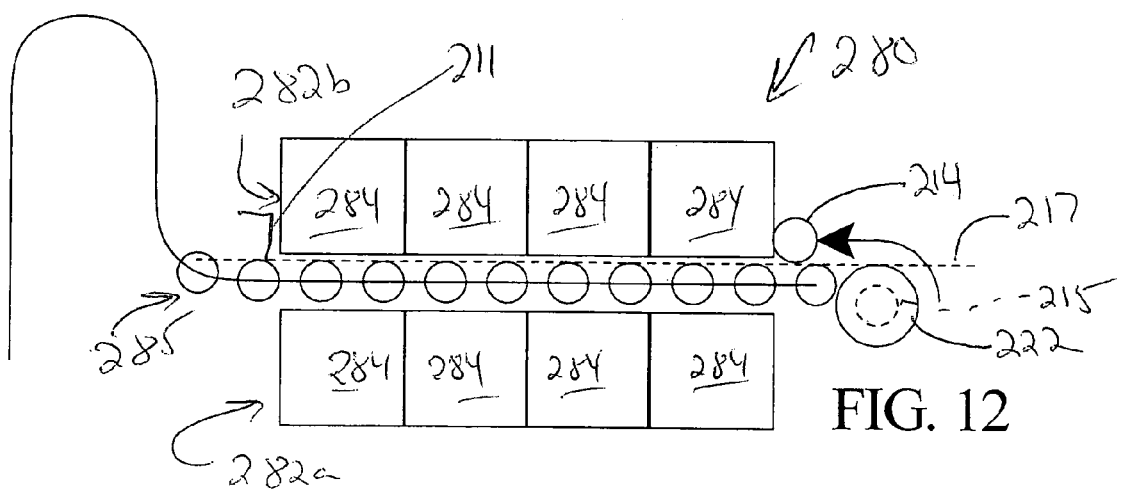

In FIG. 12, a complete layer 282b has now been formed upon layer building surface 217. This formation process includes laterally inward compression by means of side clamps 286a and 286b (not illustrated in FIGS. 11-16) and longitudinal compression by means of layer 282b captured between clamp bar 214 and stop 211. Thus, as illustrated in FIG. 12 back clamp assembly 210 has been activated to bring clamp bar 214 out of its submerged position below surface 217 and toward stop 211. With layer 282 captured between bar 214 and stop 211, layer 282 is longitudinally compressed.

Figure 13:
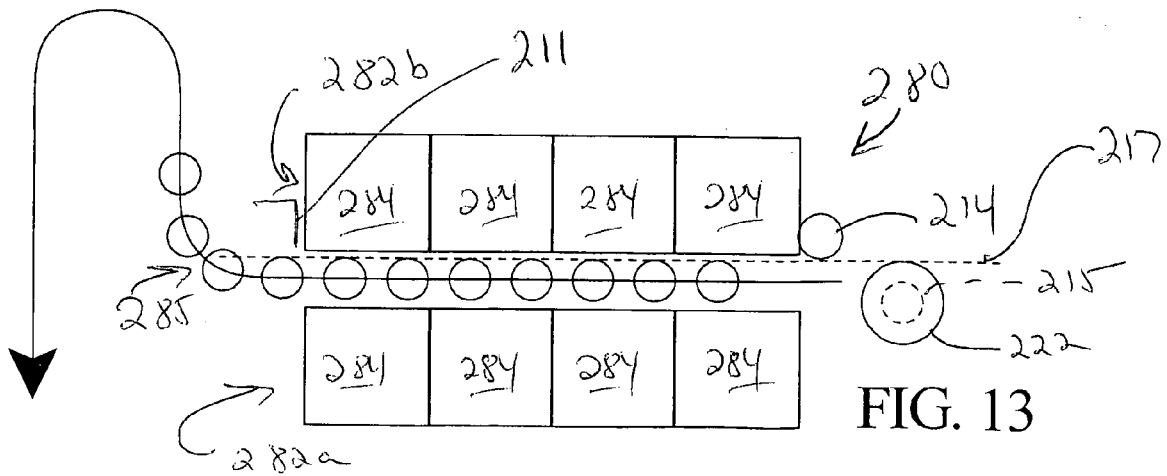

In FIG. 13, roller floor 285 begins to move out from under layer 282b. The first-to-drop row 284a remains in contact with clamp bar 214. Without such contact, the first-to-drop row 284a can tip off of the trailing member of roller floor 285 and tip out of the desired layer pattern. In other words, the first-to-drop row 284a can fall out of position as it comes to rest on the layer 282a therebelow. With clamp bar 214 positioned as illustrated in FIG. 13, however, such displacement does not occur.

Figure 14:
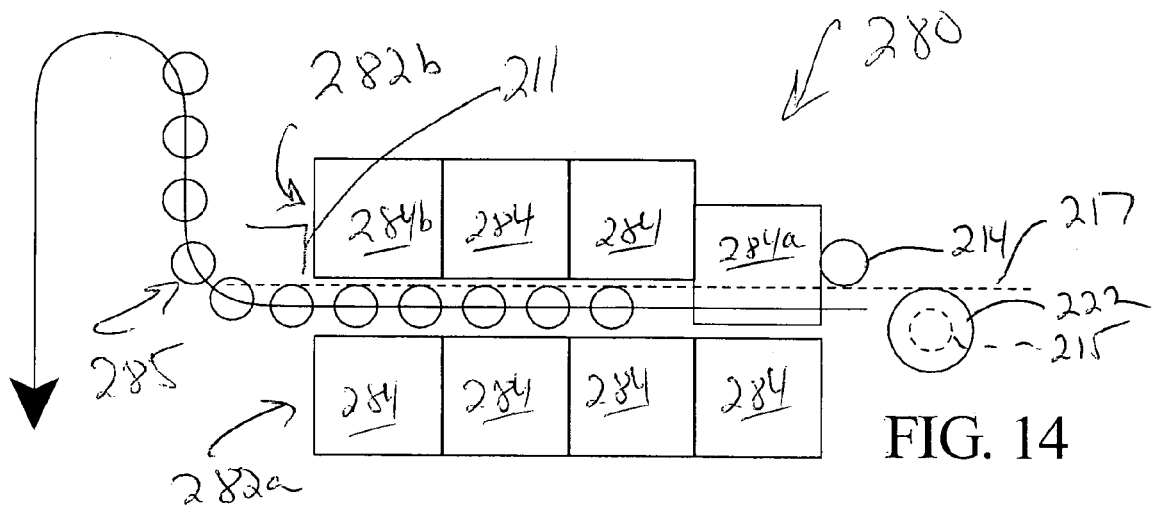

In FIG. 14, the first-to-drop row 284a has fallen through layer head 280 and onto layer 282a therebelow. Roller floor 285 continues to move out from under layer 282c as each successive next-to-drop row of items 284 falls through the opening left behind roller floor 285. Each successive row of items 284 maintains its position by virtue of contact with the previously dropped row and the next-to-drop row of items 284a. In other words, each row of items 284 enjoys guiding support as it falls from layer head 280. The first-to-drop row 284a enjoys support from clamp bar 214. The last-to-drop row 284b enjoys support from the previously dropped row of items 284 and stop 211. Intervening rows, i.e., rows between the first-to-drop row 284a and the last-to-drop row 284b enjoy guiding support from surrounding rows of items 284. As a result, each row of items 284 falling from layer head 280 as roller floor 285 moves out from thereunder enjoys guiding support and thereby arrives in a desired position upon a layer of items 284 therebelow or upon a pallet therebelow.

Figure 15:
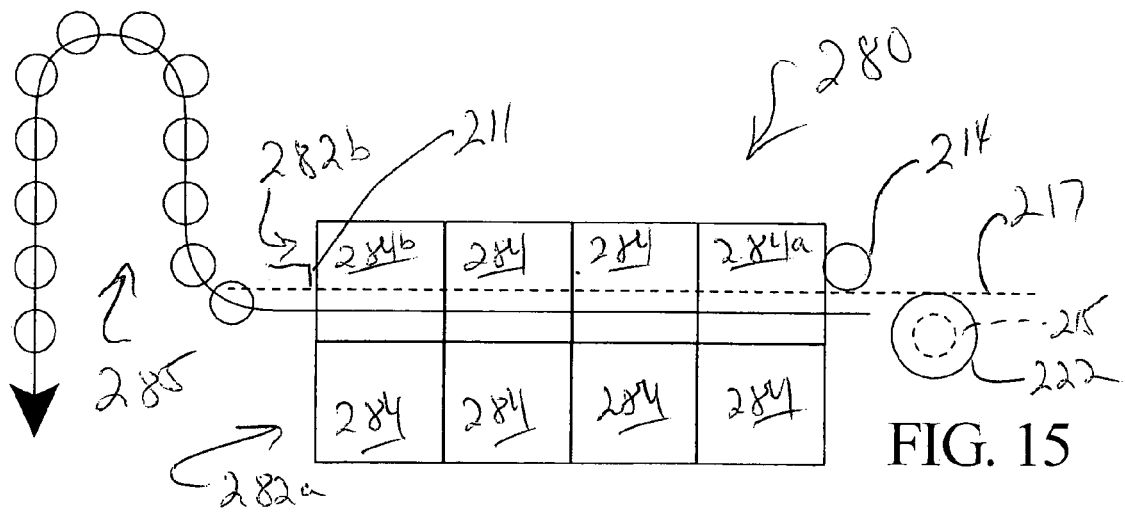

FIG. 15 illustrates complete deposit of layer 282b upon layer 282a. In other words, roller floor 285 has moved completely out from its supporting position relative to layer 282b and layer 282b has fallen through the opening left by roller floor 285. Once a layer has been so deposited, layer head 280 can be repositioned to receive a next layer 282.

Figure 16:
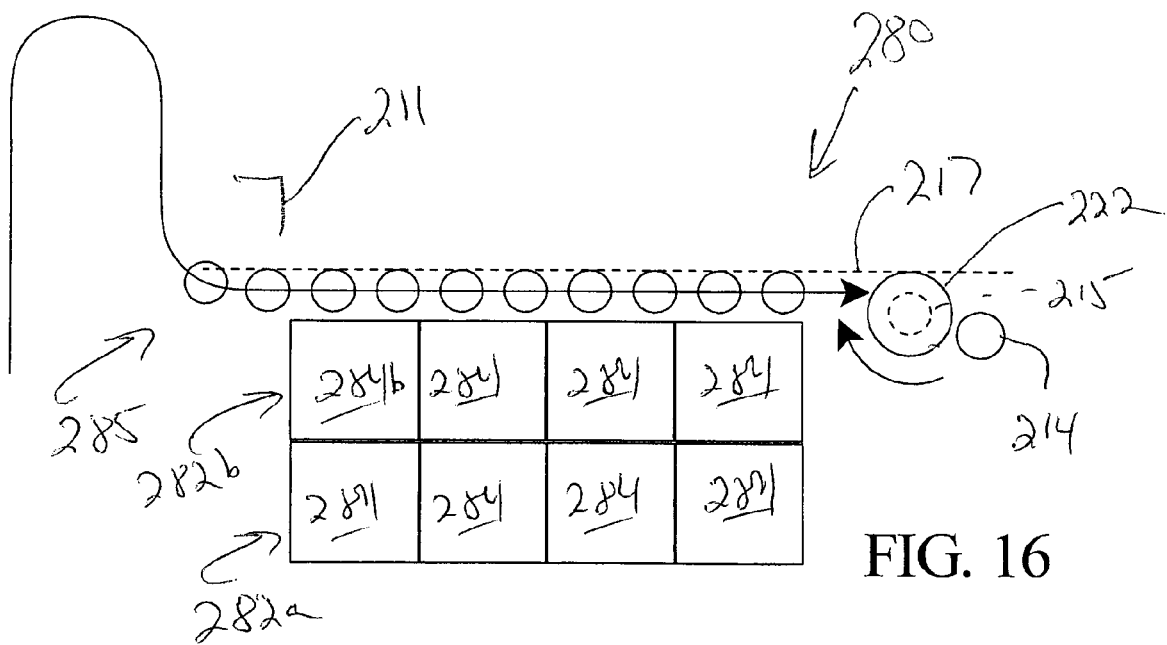

In FIG. 16, layer head 280 has been moved upward and slightly above layer 282b. Roller floor 285 has been returned to its closed position coincident with side plates 216a and 216b and layer building surface 217, and clamp bar 214 has been returned to its submerged position below surface 217. Accordingly, layer head 280 is now ready to receive additional items 284 to form a next layer 282 of items 284 upon surface 217. Eventually, a sufficient number of layers 282 have been stacked below layer head 280 and the stack of layers 282 may be removed.

Figure 17:
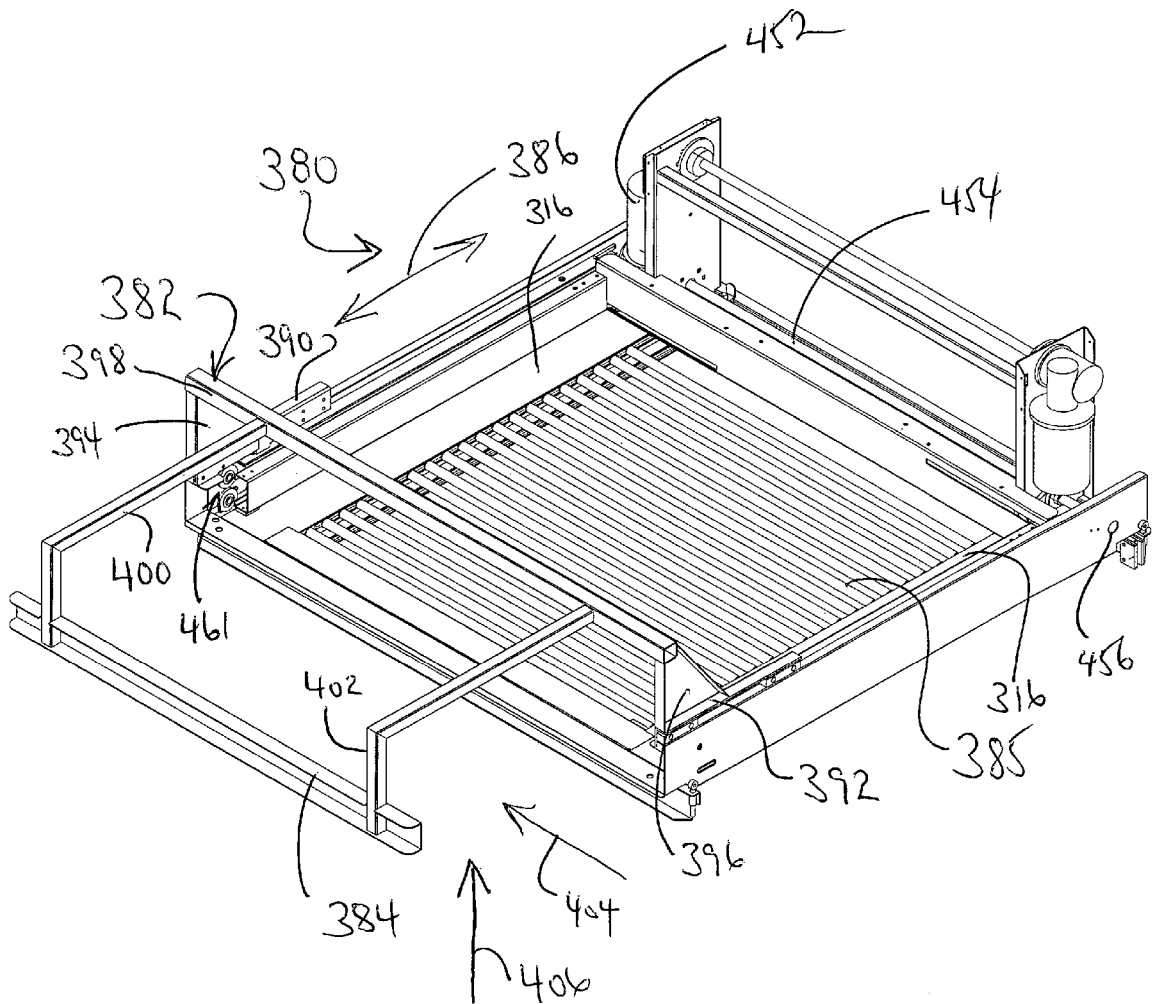
FIG. 17 illustrates an alternative layer head including a palletizing puller bar for transferring items onto the layer head.

FIG. 17 illustrates in perspective a layer head 380. Layer head 380 is generally similar to layer head 22 and layer head 280, but includes a puller bar assembly 382. Puller bar assembly 382 provides a transfer function pulling a row or rows of items 18 onto layer head 380. For example, puller bar assembly 382 replaces row pusher 30 (FIG. 1) as applied in the context of the palletizer 10. It will be understood, however, that layer head 380 need not be used in the specific context of palletizer 10 and may be applied in a variety of palletizing and depalletizing operations. Generally, puller bar assembly 382 includes a puller bar 384 positionable in its extended position as indicated in FIG. 17. By positioning a row or rows of items 18 between puller bar 384 and layer head 380 and moving puller bar 384 to its retracted positions as described more fully hereafter, a row or rows of items 18 may be transferred onto layer head 380. Thus, puller bar assembly 382 reciprocates puller bar 384 between an extended and retracted position as indicated by referenced numeral 386 in FIG. 17.

Puller bar 384 moves in a plane located just above roller floor 385 and side plates 316 of layer head 380. Puller bar assembly 382 includes a left slide 390 and a right slide 392. As described more fully hereafter, slides 390 and 392 move slidably relative to layer head 380 in the reciprocating directions indicated at reference numeral 386 in FIG. 17. Extending upward from slide 90, puller bar assembly 382 includes a left ear 394 and extending upward from slide 392 a right ear 396. Accordingly, ears 394 and 396 move reciprocally with slides 390 and 392, respectively. A tie bar 398 couples ears 394 and 396. Tie bar 398 is located sufficient distance above roller floor 385 and side plates 316 to accommodate passage of items 18 thereunder. In other words, tie bar 398 operates above a row or rows of items 18 and above a layer of items 18 as constructed upon layer head 380. An L-shaped left support arm 400 and an L-shaped right support arm 402 couple tie bar 398 and puller bar 384. In other words, arms 400 and 402 support puller bar 384 within a plane just above roller floor 385 and side plates 316. As a result, tie bar 398 and support arms 400 and 402 move above a row or rows of items 18 and a layer of items 18 as positioned on roller floor 385 and side plates 316.

With puller bar 384 in its extended position as indicated in FIG. 17, tie bar 398, support arms 400 and 402, and puller bar 384 accommodate entry of a row or rows of items 18 along a path generally parallel to puller bar 384 and intermediate puller bar 384 and layer head 380, e.g., as indicated at reference numeral 404 of FIG. 17. In other words, the architecture of puller bar 384 as shown in FIG. 17 accommodates positioning of a row or rows of items 18 by movement along a line of travel as indicated at reference numeral 404. Once positioned between puller bar 384 and layer head 380, puller bar 384 moves to its retracted position, i.e., toward layer head 380 and above roller floor 385, to position a row or rows of items 18 upon layer head 380.

In the alternative, a row or rows of items 18 may be brought vertically upward into position between the extended puller bar 384 and layer head 380 as indicated at reference numeral 406 in FIG. 17. For example, as applied in the context of the synchronized palletizer 10 of FIG. 1, a row or rows of items 18 located on row conveyor 20 may be brought vertically upward in relation to layer head 380 as indicated at reference numeral 406 and thereby positioned between puller bar 384 and layer head 380. As may be appreciated, such vertical movement of a row or rows of items 18 as indicated at reference numeral 406 may be accomplished by relative movement between row conveyor 20 and layer head 380.

Figure 18:
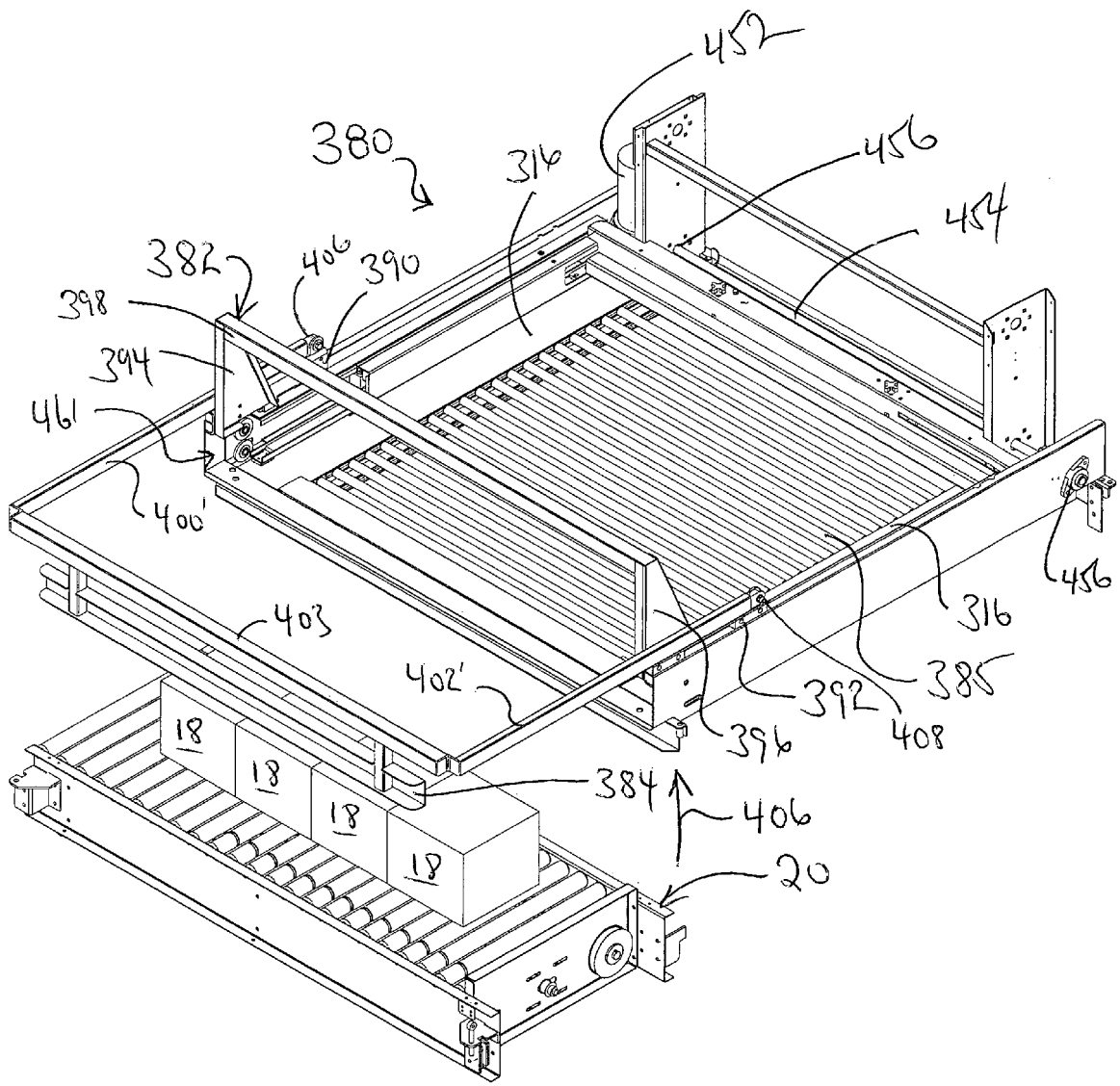
FIGS. 18-21 illustrate a second form of layer head including a puller bar and further illustrate a sequence of operation transferring items onto the layer head.

FIG. 18 illustrates an alternative layer head 380' similar to layer head 380, but including an alternative form of puller bar assembly, i.e., puller bar assembly 382'. Puller bar assembly 382' includes slides 390 and 392, ears 394 and 396 and tie bar 398. Puller bar assembly 382' also includes a puller bar 384 moving between an extended and retracted position just above the plane of roller floor 385 and side plates 316. Assembly 382' differs from assembly 382 in that support arms 400' and 402' attach at slides 390 and 392 and extend horizontally toward and just above puller bar 384. A cross bar 403 couples arms 400' and 402' and supports directly therebelow puller bar 384. Arm 400' pivotally couples at pivot pin 406 relative to slider 390 and arm 402' pivotally couples at pivot pin 408 relative to slider 390. Generally, puller bar assembly 382' accommodates vertical movement of a row or rows of items 18 into position between puller bar 384 and layer head 380'. Pivotally mounting arms 400' and 402' allows movement of arms 400' and 402' together with puller bar 384 should an undesired or unintended collision occur during such relative vertical movement of a row or rows of items 18 into position between puller bar 384 and layer head 380'. For example, as applied in the context of a palletizer 10 row conveyor 20 moves a row or rows of items 18 resting thereon into position between puller bar 384 and layer head 380' by relative vertical movement between conveyor 20 and layer head 380'. During such relative vertical movement, unintended collision could occur, e.g., by virtue of a misplace item 18, and free pivotal mounting of puller bar 384 avoids damage to the item 18 or to the palletizing equipment.

FIGS. 18-21 illustrate use of layer head 380' in the context of palletizer 10. It will be understood, however, that layer head 380' may be used in a variety of palletizing and depalletizing operations apart from the specific synchronized palletizer 10. In FIG. 18, a row of items 18 reside upon row conveyor 20. Row conveyor 20 moves relative to layer head 380' as indicated at reference numeral 406 with puller bar 384 in its extended position. In other words, layer head 380' may be moved vertically downward relative to conveyor 20, conveyor 20 may be moved vertically upward relative to layer head 380' or a combination of vertically downward movement for layer head 380' and vertically upward movement for conveyor 20 may occur to position the row or rows of items 18 between puller bar 384 and layer head 380'.

Figure 19:
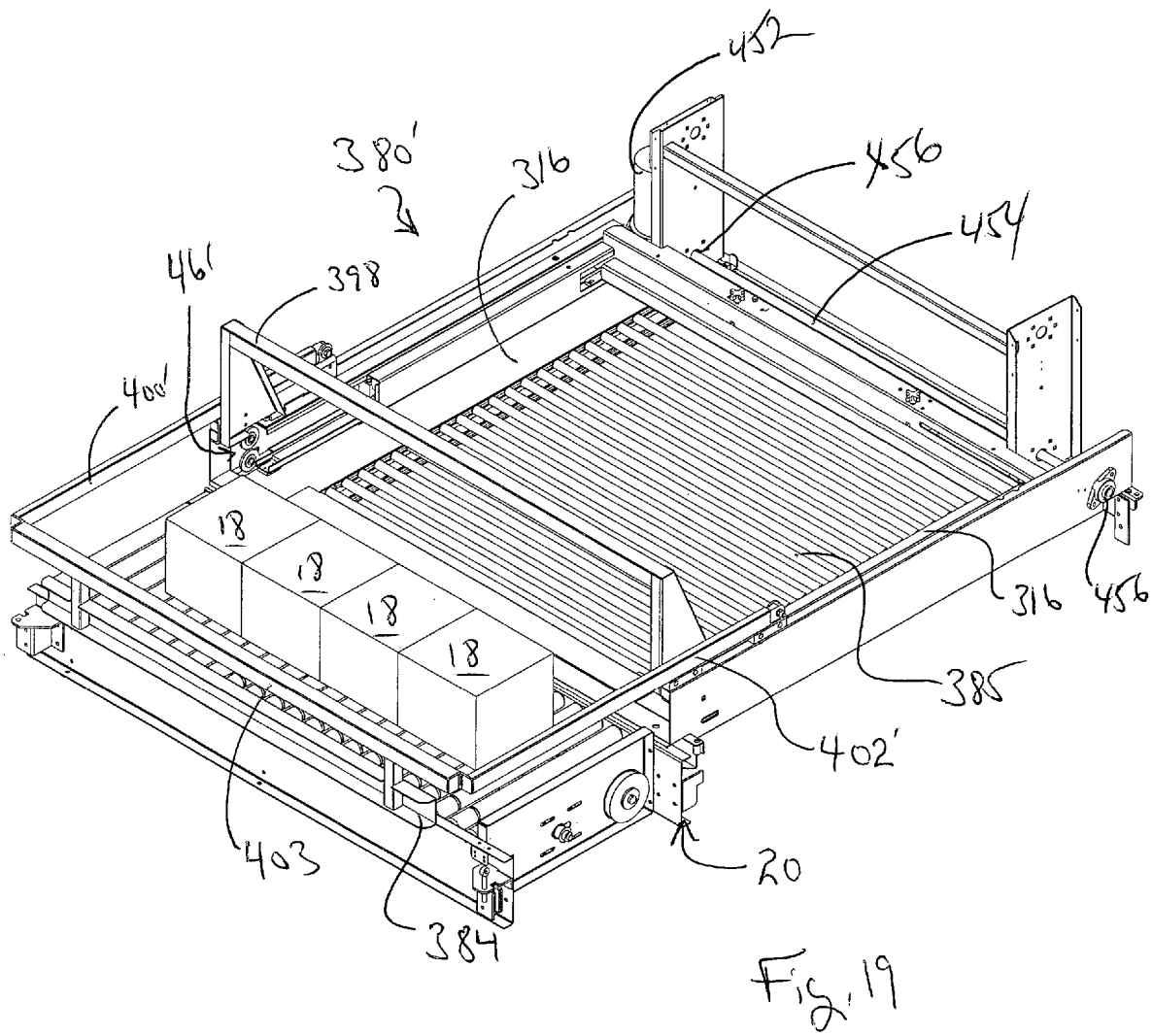

FIG. 19 illustrates the coordinated positioning of conveyor 20 and layer head 380' with a row or rows of items 18 positioned between puller bar 384 and layer head 380'. In such position, puller bar 384 is retracted inward toward layer head 380' to engage the row or rows of items 18 at puller bar 384 and move the row or rows of items 18 onto roller floor 385 and, possibly, side plates 316.

Figure 20:
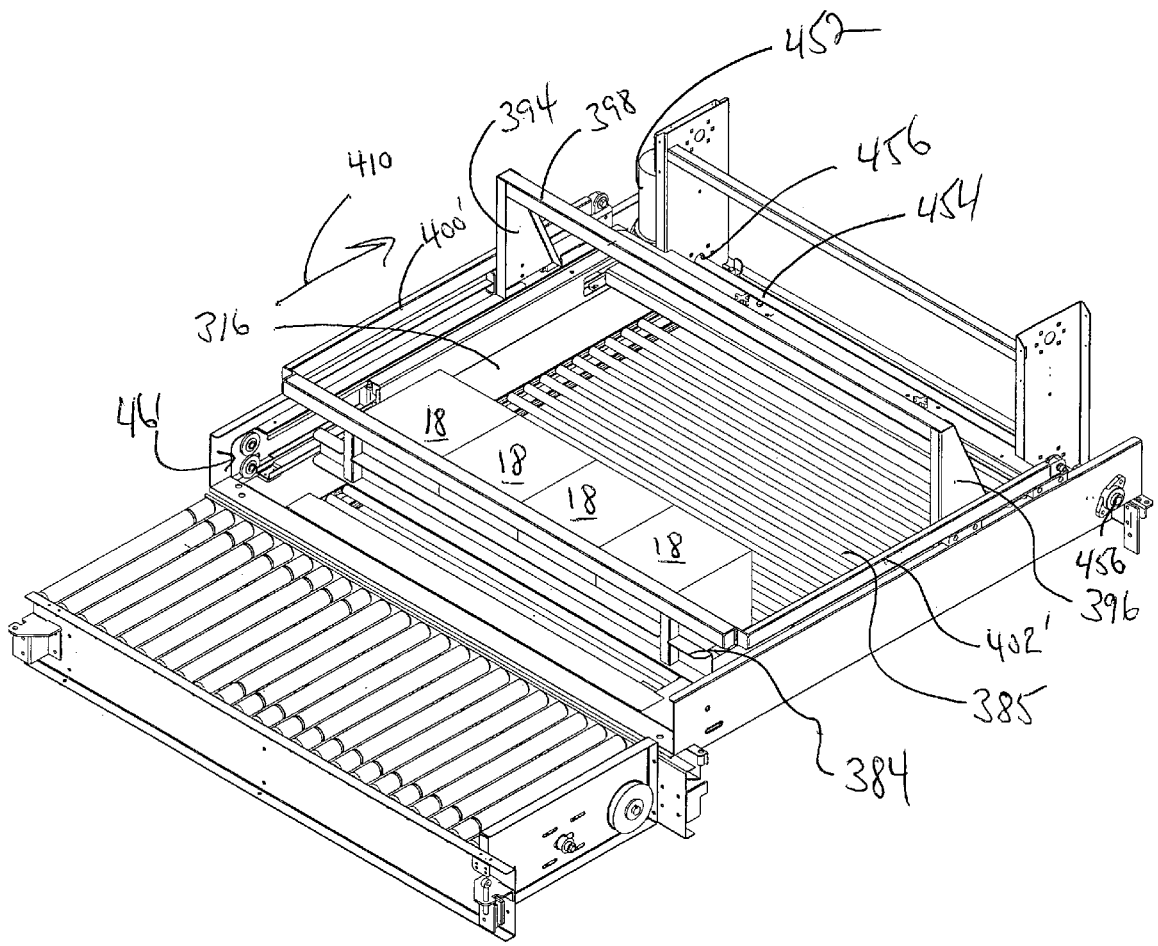

FIG. 20 illustrates movement of puller bar 384 inward as indicated at reference numeral 410 toward and over roller floor 385 and side plates 316. Puller bar 384 travels sufficient distance to bring the row or rows of items 18 onto roller floor 385 and side plates 316 as shown in FIG. 20. Thus, the first row or rows of items 18 pulled onto layer head 380', occupy a position as indicated in FIG. 20. Subsequent row or rows of items 18 pulled onto layer head 380 urge prior rows of items 18 further onto layer head 380.

Figure 21:
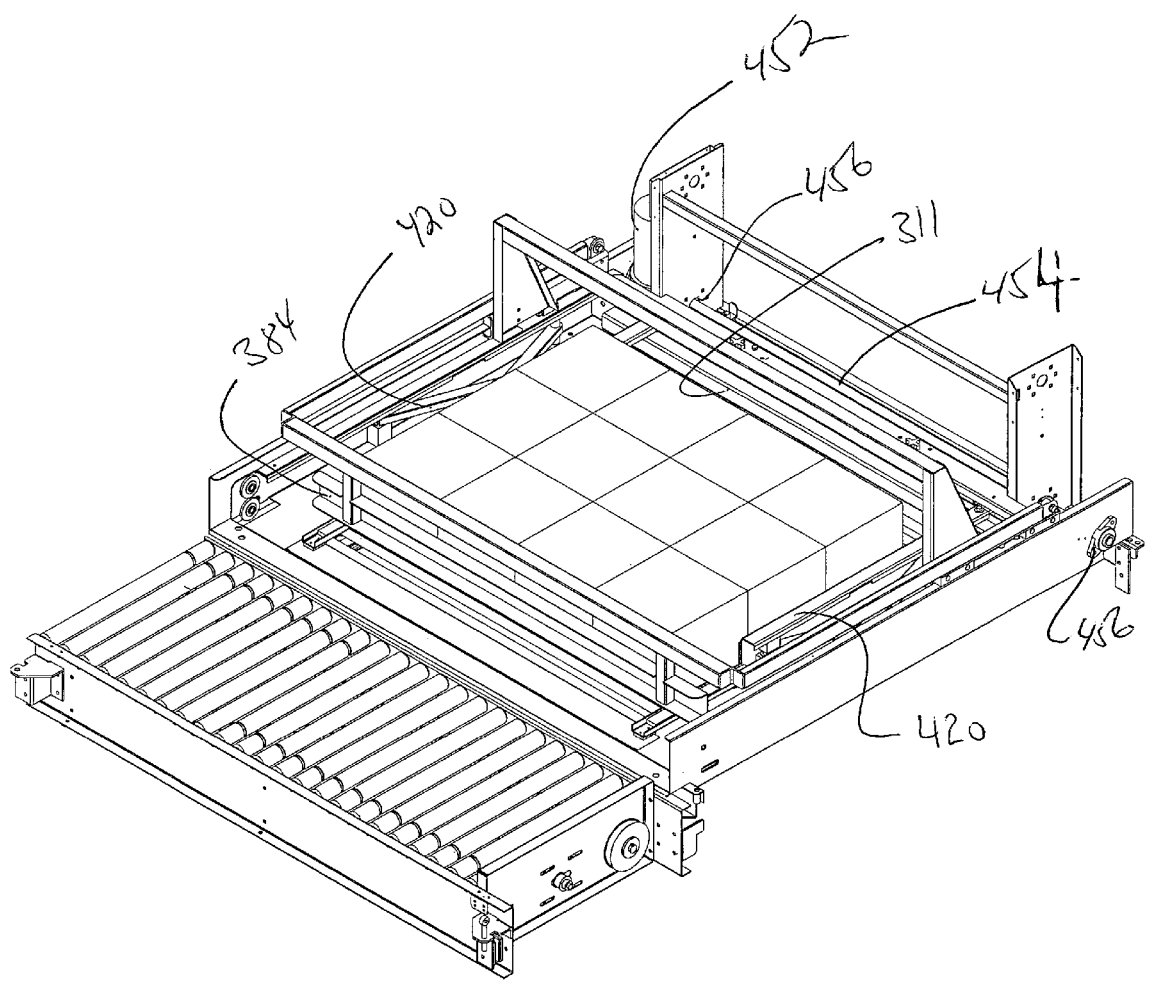

FIG. 21 illustrates layer head 380' following such subsequent placement of rows of items 18 on layer head 380'. For each new row pushed onto layer head 380', earlier rows of items 18 are urged further onto layer head 380'. Eventually, a complete layer of items 18 is formed on layer head 380'. Side clamps 420 urge the layer of items 18 laterally inward while puller bar 384 pushes the layer of items 18 against stop 311. As a result, the layer of items 18 is collapsed inward laterally and between puller bar 384 and stop 311. A fully collapsed layer of items 18 results and occupies a position on roller floor 385. As described above for layer head 22, roller floor 385 may be retracted with movement thereof towards stop 311 to drop the layer of items 18 vertically downward through layer head 380'. As with dead plate 108 and submerged clamp bar 215, puller bar 384 provides an "anti-tipping" function with respect to the first-to-drop row of items 18. In other words, puller bar 384 serves a similar function as that depicted with respect to submerged clamp bar 214 in FIGS. 11-16 to promote a well organized layer of items 18 as deposited below layer head 380'.

Thus, puller bar 384 provides a transfer function pulling a row or rows of items 18 onto a layer head, a compression function to collapse and better organize a layer of items 18 upon a layer head, and an "anti-tipping" function when retracting a roller floor to deposit a layer of items 18 through a retractable floor of a layer head.

Figure 22:
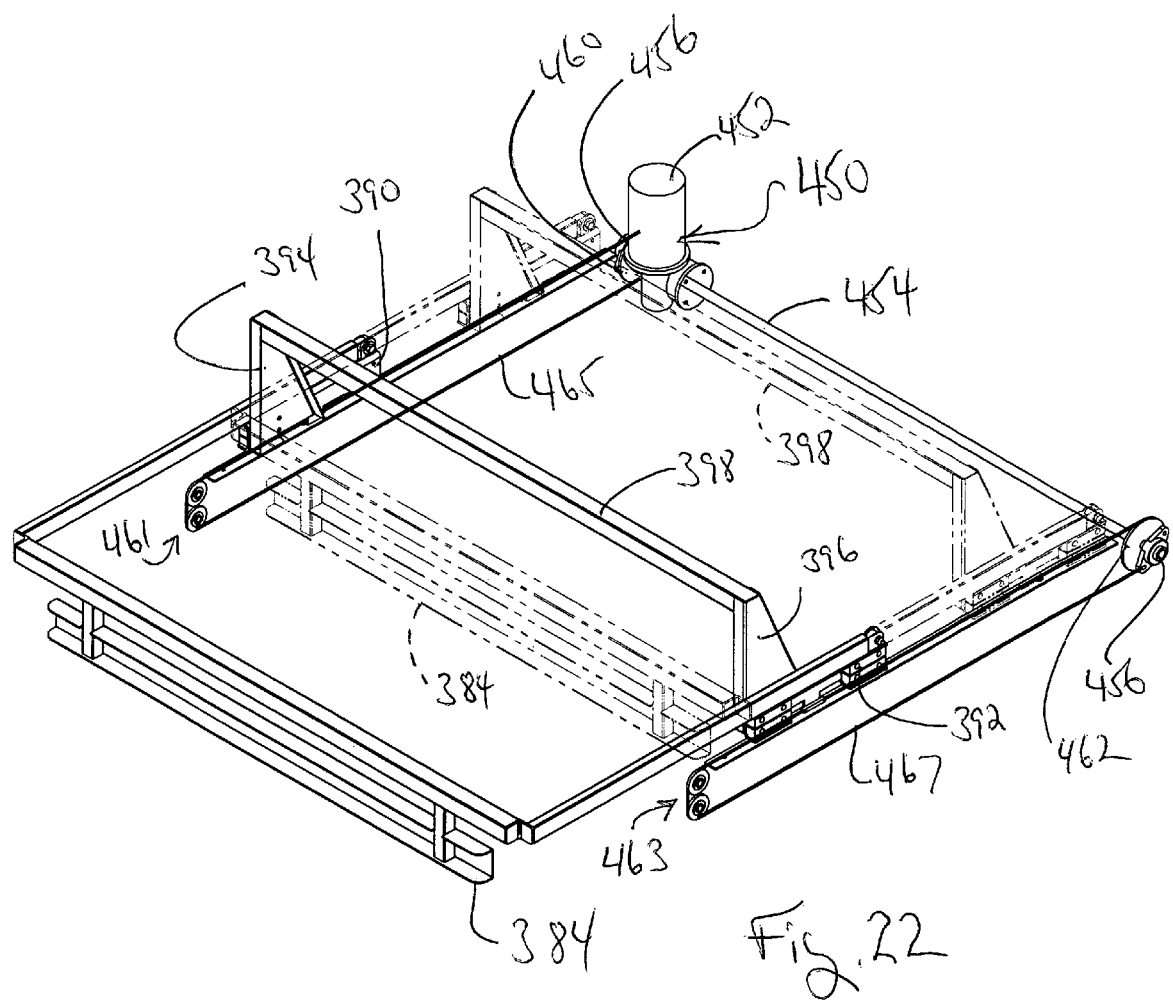
FIG. 22 illustrates a drive mechanism for the puller bar of FIGS. 17-21.

FIG. 22 illustrates a drive mechanism 450 applicable to the puller bar assemblies 382 and 382' as described herein above. Drive mechanism 450 includes a drive motor 452 coupled by worm gear (not shown) to a drive shaft 454. Drive shaft 454 mounts rotatably relative to layer head 380 and/or 380' at drive shaft bearings 456. Drive shaft 454 carries a left drive pulley 460 and a right drive pulley 462. Rotatably mounted to layer head 380 and/or layer head 380', a left idle pulley set 461 couples by chain 465 to left drive pulley 460. A right idle pulley set 463 couples by chain 467 to right idle pulley 462. Thus, operation of drive motor 452 in a first direction drives chains 465 and 467 in a first rotational direction while operation of drive motor 452 in an opposite direction moves chains 465 and 467 in an opposite rotational direction. Left slide 390 couples to chain 465 and right slide 392 couples to right chain 467. Drive motor 452 thereby reciprocates slides 390 and 392 as indicated at reference 386 in FIG. 17. FIG. 22 shows puller bar 384 in its extended position. In phantom, FIG. 22 shows puller bar 384 in its retracted position.

The illustrated puller bar, being mounted upon a vertically reciprocating layer head with layer building platform, improves overall palletizing operations. For example, once a row or rows of items 18 have been engaged by puller bar 384 and have been positioned sufficiently onto the layer head, a structure previously supporting the row or rows of items 18, e.g., conveyor 20 in the example of palletizer 10, may be withdrawn relative to the layer head. In other words, a row or rows of items 18 positioned between puller bar 384 and layer head 380 or 380' need be only partially taken onto the layer head 380 or 380', e.g., sufficiently to support the row or rows of items 18 thereon, and conveyor 20 may be withdrawn immediately without waiting for fully transferring the row or rows of items 18 onto layer head 380 or 380'. Overall palletizing operations thereby improve by speeding the transfer of items 18 from conveyor 20 to layer head 380 or 380'. Thus, in a vertically reciprocating layer head including a layer building platform, mounting a puller bar thereon improves item transfer time from a separate device positioning the row or rows of items in relation to the puller bar.

Figure 23:
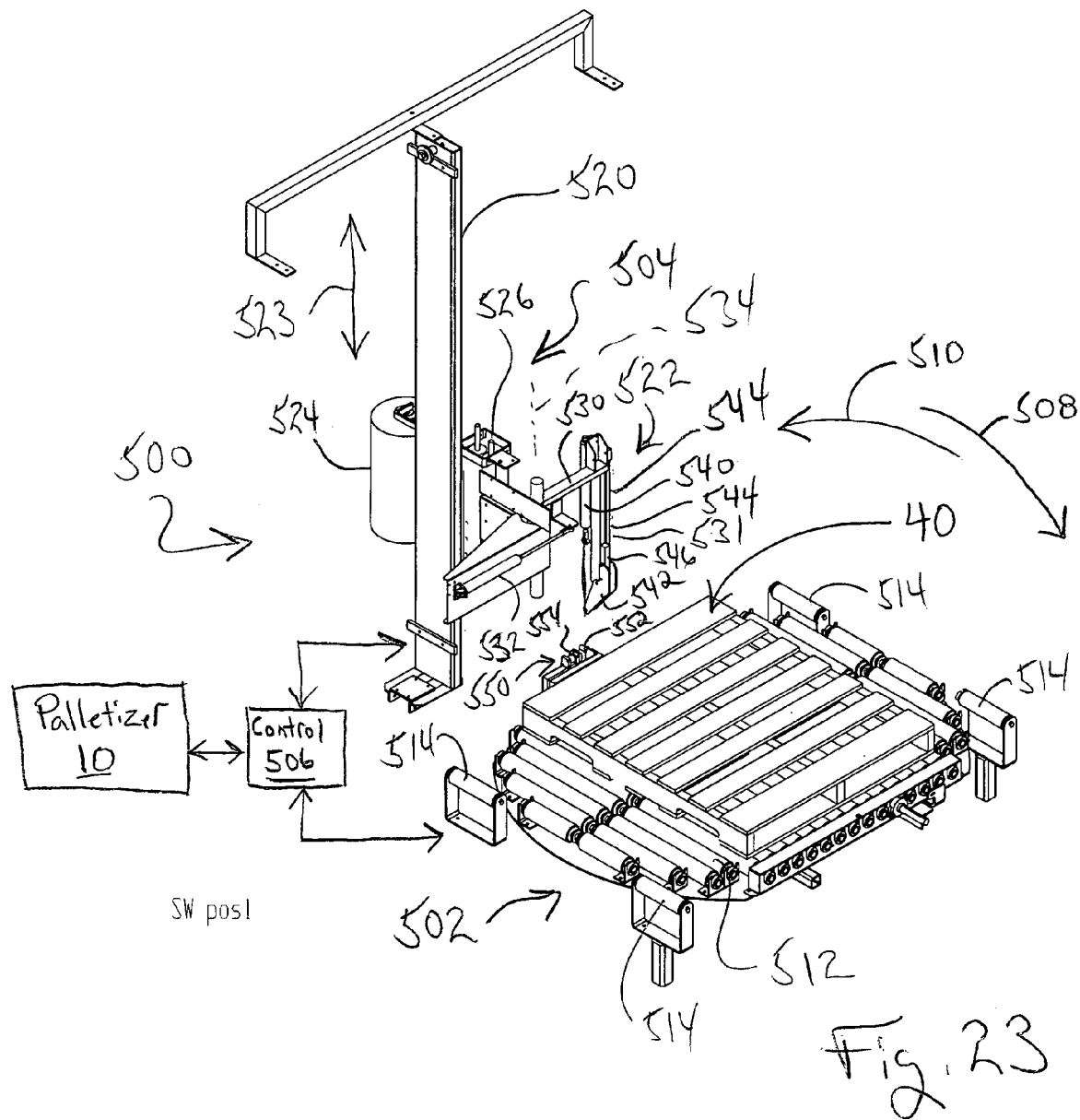
FIG. 23 illustrates a stretch wrapper as applied in the context of concurrent palletizing and wrapping operations.

FIG. 23 illustrates a stretch wrapper 500. Stretch wrapper 500 may be incorporated into a variety of palletizing operations. It will be understood, therefore, that stretch wrapper 500 is not limited to the particular palletizing context illustrated herein. Thus, FIG. 23 illustrates a pallet 40 and it will be understood that a palletizer, e.g., synchronized palletizer 10, stacks layers of items 18 upon pallet 40. As integrated into synchronized palletizer 10 pallet 40 of FIG. 23 is located in a position corresponding to that indicated in FIG. 1. In other words, pallet 40 of FIG. 23 is located in such position relative to a palletizing machine to receive sequentially layers of items 18 thereon. It will be understood, therefore, that any given palletizing operation may be employed in combination with stretch wrapper 500 where layers of items 18 are deposited upon a pallet 40 or other similar support structure to build a stack of item 18 layers thereupon.

Stretch wrapper 500 includes a pallet turntable 502 and a stretch wrap dispenser 504. Stretch wrapper 500 operates under a programmable control 506 illustrated schematically in FIG. 23. As may be appreciated, control 506 orchestrates operation of stretch wrapper 500 as described hereafter. Control 506 also controls a corresponding palletizer device for coordinated operation thereof, e.g., coordinating stretch wrapper 500 procedures with deposit of item 18 layers upon pallet 40 or upon previously deposited layers of items 18. For example, control 506 coordinates operation of palletizer 10 with operation of stretch wrapper 500.

Turntable 502 selectively rotates in a clockwise direction 508 and a counter clockwise direction 510. Turntable 502 also includes a set of selectively powered rollers 512 and associated stationary peripheral support rollers 514. As may be appreciated, powered rollers 512 may be selectively operated in first and second directions to move a pallet 40 resting thereon in corresponding first and second directions transverse to rollers 512. Accordingly, pallet 40 may be brought onto table 502 by an associated conveyance (not shown) and positioned selectively upon turntable 502 at a given angular orientation. By aligning power rollers 512 transverse to a selected approach path for pallet 40 a leading edge of pallet 40 may be engaged by rollers 512 to bring pallet 40 onto turntable 502. Thereafter, pallet 40, and any items 18 stacked thereupon, may be rotated selectively in clockwise direction 508 or counterclockwise direction 510. As will be described more fully hereafter, rotating pallet 40 with items 18 stacked thereon while concurrently dispensing stretch wrap film from wrapper 500 accomplishes coordinated palletizing operations and stretch wrapping operations. Once pallet 40 has received a stack of items 18 and the stack of items 18 have been suitably wrapped, the assembly can be taken from turntable 502 by suitably orienting, e.g., by clockwise rotation 508 or counterclockwise rotation 510, rollers 512 transverse to a selected exit path. Power rollers 512 may then be activated to move pallet 40 and its associated wrapped stack of items 18 along the selected exit path from turntable 502 and onto an associated exit conveyance (not shown).

Dispenser 504 includes a vertically disposed tower 520. A film carriage 522 reciprocates vertically upon tower 520 as indicated at reference numeral 523. Carriage 522 includes a roll of stretch film 524 and a set of pre-stretch rollers 526 as known in the art. Pre-stretch rollers 526 partially stretch film 524 whereby film 524 thereafter contracts slightly and better engages a stack of items 18 once encircled thereby. There are, however, a variety of mechanisms and methods available in the art for pre-stretching stretch film 524. For example, the roll of film 524 may be braked or offer resistance against dispensing therefrom and thereby stretch film 524 as it is wrapped about a load. In some cases, film 524 need not be stretched. Accordingly, the present invention shall not necessarily be limited to use of the pre-stretch rollers 526. Generally, pre-stretch rollers 526 operate as a set of rollers pinching film 524 therebetween with a down stream roller set operating at a slightly greater speed relative to upstream roller set.

Carriage 522 further includes a selectively positionable gripping and cutting arm 530. Arm 530 pivots about a vertical axis 534. A pneumatic cylinder 532 couples carriage 522 and arm 530 to accomplish pivoting movement of arm 530. The distal end of arm 530 carries a vertically disposed arm 531. Arm 531 carries a clamp cylinder 540, a pivotally mounted clamp 542, and a hot wire film cutter 544. While a particular form of film cutter is illustrated herein, i.e., a hot wire film cutter 544, it will be understood that a variety of film 524 cutting devices may be used. Accordingly, the present invention shall not be limited to a particular form of film 524 cutter. Clamp 542 pivots at the distal end of arm 531 under influence of cylinder 540. A foot 546 of clamp 542 thereby pivots into arm 531 in its closed position and away from arm 531 in its open position. As described more fully hereafter, selective operation of cylinder 540 opens and closes clamp 542 whereby a lower edge of film 524 may be captured between foot 546 and arm 531.

Turntable 502 includes a linear clamp 550. Thus, clamp 550 includes a pair of clamp feet 552 and 554 moveable in linear fashion relative to one another to selectively open and close clamp 550. Clamp 550 resides upon turntable 502. Clamp 550 thereby rotates in clockwise direction 508 and counterclockwise direction 510 along with turntable 502. Coordinated operation of arm 530 and clamps 542 and 550 permit carriage 522 to pass a distal end of film 524 from clamp 542 to clamp 550. For example, with the distal end of film 524 engaged by clamp 542, arm 530 may be swung into suitable position relative to clamp 550 to position an edge of film 524 within the feet 552 and 554 of clamp 550. Closing clamp 550 and subsequently opening clamp 542 accomplishes a "hand off" of film 524 from clamp 542 to clamp 550.

Accordingly, it will be understood that control 506 may be programmed to accomplish a variety of procedures relative to wrapper 500.

A CARRIAGE UP procedure moves carriage 522 vertically upward along tower 520. As may be appreciated, carriage 522 enjoys a range of travel sufficiently high to position film 524 at the top layer of a stack of items 18 resting on pallet 40.

A CARRIAGE DOWN procedure moves carriage 522 vertically downward along tower 520. As may be appreciated, carriage 522 may be moved sufficiently low enough to pass film 524 from clamp 542 to clamp 550.

Accordingly, it will be understood that carriage 522 may be selectively positioned along tower 520 between a lower-most position sufficiently low to pass film from clamp 542 to clamp 550 and sufficiently high enough to wrap film 524 around a stack of items 18 resting upon pallet 40.

A ROTATE CLOCKWISE procedure occurs by operation of turntable 502 in the clockwise direction 508. Similarly, a ROTATE COUNTERCLOCKWISE procedure occurs by rotation of turntable 502 in the counterclockwise direction 510. Thus, turntable 502 may be positioned at a selected angular orientation to accomplish a variety of tasks. For example, turntable 502 may be selectively positioned to receive a pallet 40 along an approach path or to eject pallet 40 along an exit path. Generally, when coordinating palletizing and wrapping operations, an empty pallet 40 is brought onto turntable 502 and a loaded pallet 40, i.e., holding a stack of items 18 thereon, exits turntable 502. It will be understood, however, that wrapper 500 could be used apart from wrapper operations wherein a loaded pallet 40 may be brought onto turntable 502. With film 524 engaged at clamp 550 ort otherwise attached to a load of items 18, rotating turntable 502, e.g., in the clockwise direction 508, dispenses film 524 and wraps film 524 about the load.

A SWING IN procedure activates cylinder 532 to bring arm 530 toward turntable 502. A SWING OUT procedure occurs by actuating cylinder 530 in an opposite direction to move arm 530 away from turntable 502.

An ARM CLAMP OPEN procedure occurs by activating cylinder 540 to pivot clamp 542 in such direction to move foot 546 away from arm 531. An ARM CLAMP CLOSE procedure occurs by actuating cylinder 544 in an opposite direction to bring food 546 against arm 541.

A TURNTABLE CLAMP CLOSE procedure occurs by actuating clamp 550 to bring clamp feet 552 and 554 together. A TURNTABLE CLAMP OPEN procedure occurs by bringing clamp feet 552 and 554 away from one another.

A ENERGIZE CUTTER procedure occurs by suitably positioning film 524 against hot wire cutter 544 and actuating cutter 544, e.g., passing electrical current therethrough to elevate the temperature of cutter 544 and thereby sever film 524.

A DROP LAYER procedure may be executed by coordinated operation of an associated palletizing device. For example, synchronized palletizer 10 may be operated to bring a layer of items 18 onto pallet 40 or onto a previously deposited layer of items 18. In other words, the DROP LAYER procedure brings a layer of items 18 onto pallet 40 or a stack of items 18 resting thereon.

In a LAYER BUILD procedure rows of items are accumulated onto a layer build platform. This process occurs concurrently, but independent of stretch wrap operations.

A TURNTABLE HOME procedure rotates turntable 502 to place turntable clamp 550 as indicated in FIG. 23, i.e., in position to interact with clamp 542. Typically, the direction of rotation would be along clockwise rotation 508 as such rotation corresponds with rotation executed for film 524 wrapping as described more fully hereafter.

A PALLET MOVE procedure activates power rollers 512 according to a desired direction of travel for a pallet 40 to accomplish or exit of a pallet 40 and/or load of items 18 resting thereon.

An EMPTY PALLET ENTRY procedure begins with a ROTATE CLOCKWISE procedure or a ROTATE COUNTERCLOCKWISE procedure to align turntable 502 suitably with an approach path relative to a pallet conveyor infeed device. Next, a PALLET MOVE procedure is executed to draw the empty pallet 40 from the infeed conveyor onto turntable 502.

A PALLET POSITION procedure is used to appropriately position a pallet 40 for row push direction. A ROTATE CLOCKWISE procedure or a ROTATE COUNTERCLOCKWISE procedure is executed to suitably align a pallet 40 along its forty inch dimension or along its forty eight inch dimension with the desired orientation for a DROP LAYER procedure. In other words, turntable 502 is suitably oriented to receive a next layer of items 18 according to a particular stacking pattern.

A DEPOSIT LAYER procedure begins with turntable 502 pre-positioned to receive a next layer of items 18. In other words, before receiving a layer of items 18, turntable 502 is positioned suitably according to a particular stacking pattern. Following such positioning, a DROP LAYER procedure maybe executed to bring a next layer of items 18 into wrapper 500.

A START WRAP procedure begins with one or more DEPOSIT LAYER procedures. In other words, wrapping a load is typically preceded by one or more unwrapped layers of items 18 begin deposited. If necessary, a ROTATE CLOCKWISE procedure or a ROTATE COUNTERCLOCKWISE procedure is executed to align clamp 550 with tower 520. In other words, turntable 502 is brought to its home position in preparation for handing film 524 from clamp 542 to clamp 550. Next, a TURNTABLE CLAMP OPEN procedure is executed to prepare clamp 550 receiving film 524. A SWING IN procedure is executed to bring clamp 542 into vertical alignment with clamp 550. A CARRIAGE DOWN procedure is then executed to lower film 524 into clamp 550. Next, a TURNTABLE CLAMP CLOSE procedure is executed to grip the lower edge of film 524 at clamp 550. With film 524 so engaged at clamp 550, an ARM CLAMP OPEN procedure is executed to release film 524 relative to carriage 522. This allows a SWING OUT procedure to occur whereby clamp 542 is taken out of vertical alignment with clamp 550. Next, a ROTATE CLOCKWISE procedure occurs to begin pulling film 524 from carriage 522 and thereby begin wrapping film 524 about items 18. Following completion of approximately one revolution of table 502, a TURNTABLE CLAMP OPEN procedure may be executed to release film 524 from clamp 550. As the ROTATE CLOCKWISE procedure continues, a CARRIAGE UP procedure is executed at a suitable rate to achieve a desired film overwrap. In other words, coordinated upward movement of carriage 522 occurs along with clockwise rotation of turntable 502 to suitably wrap a load of items 18.

An INTERMEDIATE WRAP procedure begins after one or more DROP LAYER procedures have occurred. In other words, in support of coordinated palletizing and wrapping operations after one or more layers of items 18 have been deposited, the INTERMEDIATE WRAP procedure is initiated to wrap such newly deposited layers of items 18. Because film 524 is already engaged or encircled about the previously deposited layers of items 18, a ROTATE CLOCKWISE procedure is executed to further encircle film 524 about the load, i.e., to wrap the newly deposited layers of items 18. In coordination with the ROTATE CLOCKWISE procedure, a CARRIAGE UP procedure is executed at a rate necessary to achieve a desired film overwrap. The ROTATE CLOCKWISE procedure terminates when the newly deposited layers of items 18 have been suitably wrapped and when turntable 502 is positioned to receive additional layers of items 18.

A FINAL WRAP procedure occurs following a FINAL DROP LAYER procedure. In other words, once the final layer of items 18 have been deposited, the wrapping process can be terminated. A ROTATE CLOCKWISE procedure executes to encircle the final layer of items 18. A CARRIAGE UP procedure is executed at a suitable rate to achieve desired film 524 overwrap until the film is located at the top of the load of items 18. The ROTATE CLOCKWISE procedure terminates when the turntable is positioned to align with a discharge conveyor. In other words, rotation continues until the power rollers 512 are aligned transverse to an exit path. A SWING IN procedure is then executed in coordination with an ARM CLAMP OPEN procedure to bring clamp 542 into position to engage an intermediate portion of film 524, i.e., a portion between the load of items 18 and pre-stretch rollers 526. A CARRIAGE DOWN procedure is executed to increase the "rope" of film 524 in the clamp area of clamp 542. An ARM CLAMP CLOSE procedure is then executed to capture the "roped" portion of film 524 in clamp 542. Thereafter, an ENERGIZE CUTTER procedure is executed to sever film 524 between clamp 524 and the load of items 18. With film 524 so severed, a SWING OUT procedure is executed to clear arm 530 relative to the load of items 18 in preparation for discharging the load from wrapper 500.

A DISCHARGE PALLET procedure begins with a PALLET MOVE procedure to move pallet 40 and its associated load of items 18 along a selected exit path. If necessary to align turntable 502 to receive a next empty pallet, a ROTATE CLOCKWISE procedure or a ROTATE COUNTERCLOCKWISE procedure is then executed. A CARRIAGE DOWN procedure may be then executed to position carriage 522 at an elevation for transfer of film 524 to turntable clamp 550.

For purposes of clarity in the illustrations, film 524 will not be illustrated in its extended positions from the roll of film 524 upon carriage 522 and toward and about items 18. It will be understood, however, that film 524 is pulled from the roll of film 524 by engaging film 524 initially at clamp 550 and rotating turn table 502 in the clockwise direction 508. By coordinating rotation of turntable 502 with vertical movement of carriage 522, helical wrapping of film 524 about a load of items 18 resting upon pallet 40 occurs. Generally, during such wrapping operations film 524 extends from pre-stretch rollers 526 outward, bypassing arm 530, and engaging either clamp 550 or a load of items 18 resting upon pallet 40. During cutting or transfer operations, however, arm 530 engages film 524 in the portion of film 524 intermediate pre-stretch rollers 526 and a wrapped load of items 18 in the case of a cutting procedure and a portion of film 524 intermediate clamp 542 and pre-stretch rollers 526 in the case of a film transfer operation.

For purposes of illustration a standard pallet is depicted for building load thereupon. Loads without pallets or loads build on slip sheets are equally valid using the teachings in this disclosure.

FIG. 23 illustrates an empty pallet 40 positioned upon turntable 502 with film 524 gripped in clamp 542. Wrapper 500 is now prepared to receive items 18, i.e., from an associated palletizing operation depositing layers of items 18 upon pallet 40 or upon previously deposited layers of items 18. Also in FIG. 23, turntable clamp 550 is in position aligned for interaction with arm clamp 542. Turntable clamp 550 need not, however, necessarily be aligned relative to arm clamp 542 when receiving pallet 40 or during initial stacking of items 18 thereon. Alignment of clamps 542 and 550 occurs at the commencement of wrapping procedures, i.e., when a distal end of film 524 is transferred from clamp 542 to clamp 550 when turntable 502 is in its "home" position as illustrated in FIG. 23. Thus, pallet 40 as illustrated in FIG. 23 may be taken onto turntable 502 from a variety of approach paths.

Figure 24:
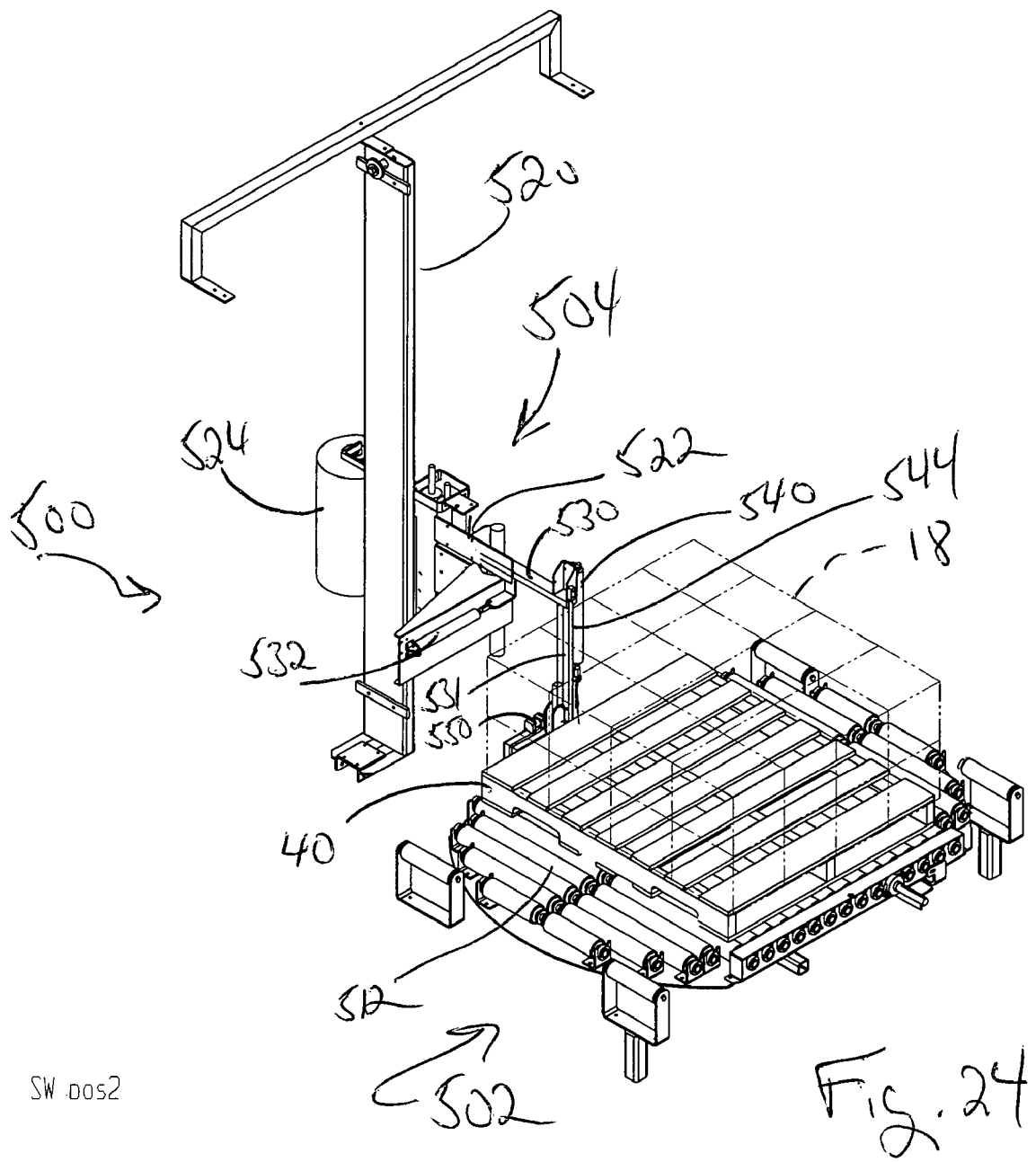
FIGS. 24-36 illustrate procedures executed in coordinated palletizing and wrapping operations.

FIG. 24 illustrates a partial or full load of items 18 received upon pallet 40. Generally, wrapping occurs once a partial item 18 load is received, but some short loads may have all stretch wrapping occur after load completion. In FIG. 24, arm 531 has been moved inward toward turntable 502 with clamp 542 in alignment with clamp 550. In other words, aligned for film 524 transfer from clamp 542 to clamp 550. Carriage 522 lowers film 524 into clamp 550 and clamp 550 engages film 524. Thereafter, clamp 542 may be deactivated whereupon rotation of turntable 502 in a clockwise direction 508 begins wrapping of film 524 about the load of items 18.

Figure 25:
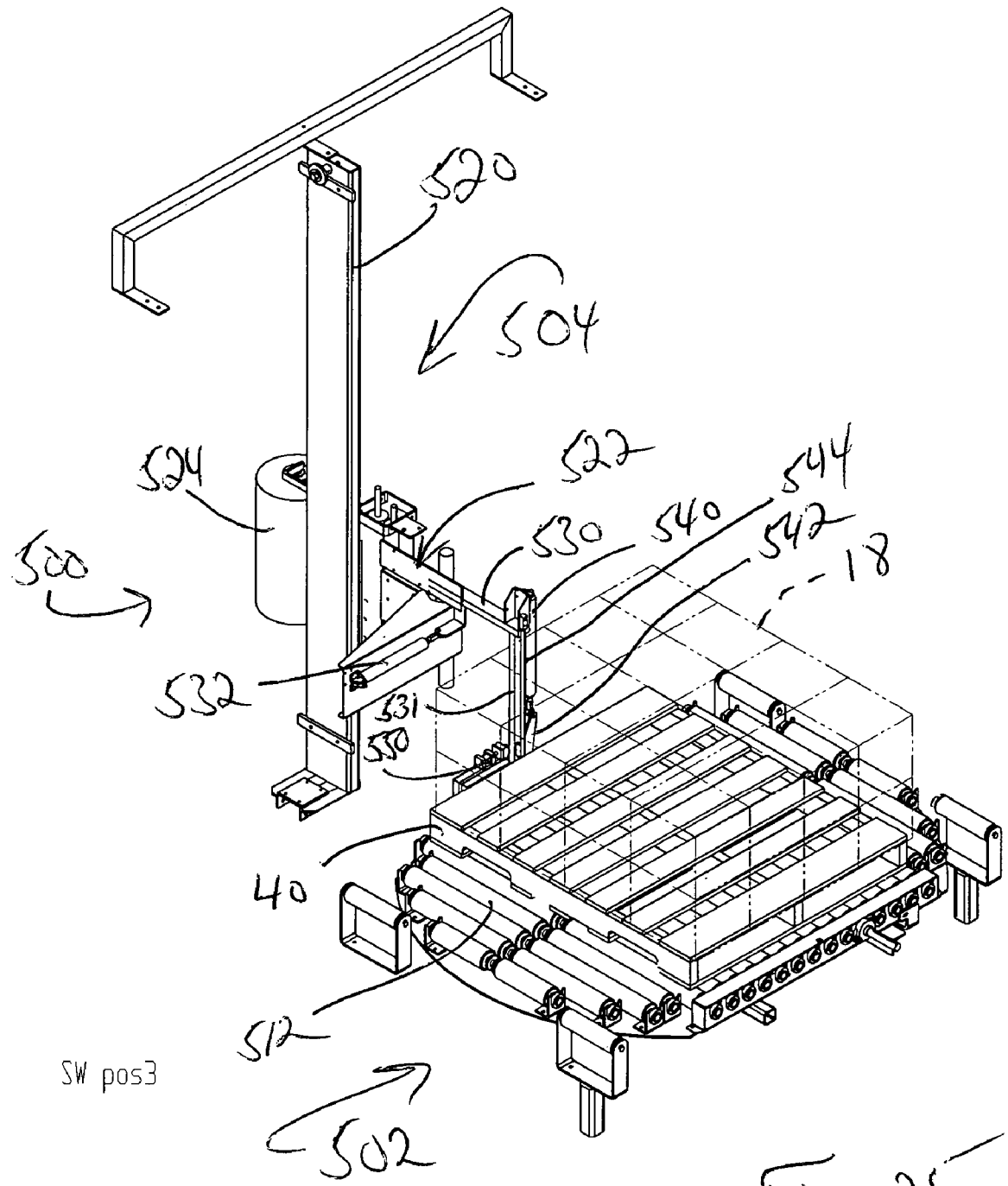

FIG. 25 illustrates clamp 542 having opened after transfer of film 524 to clamp 550. Once film 524 has been transferred to clamp 550, arm clamp 542 returns to its retracted position allowing turntable 502 rotation in support of wrapping procedures.

Figure 26:
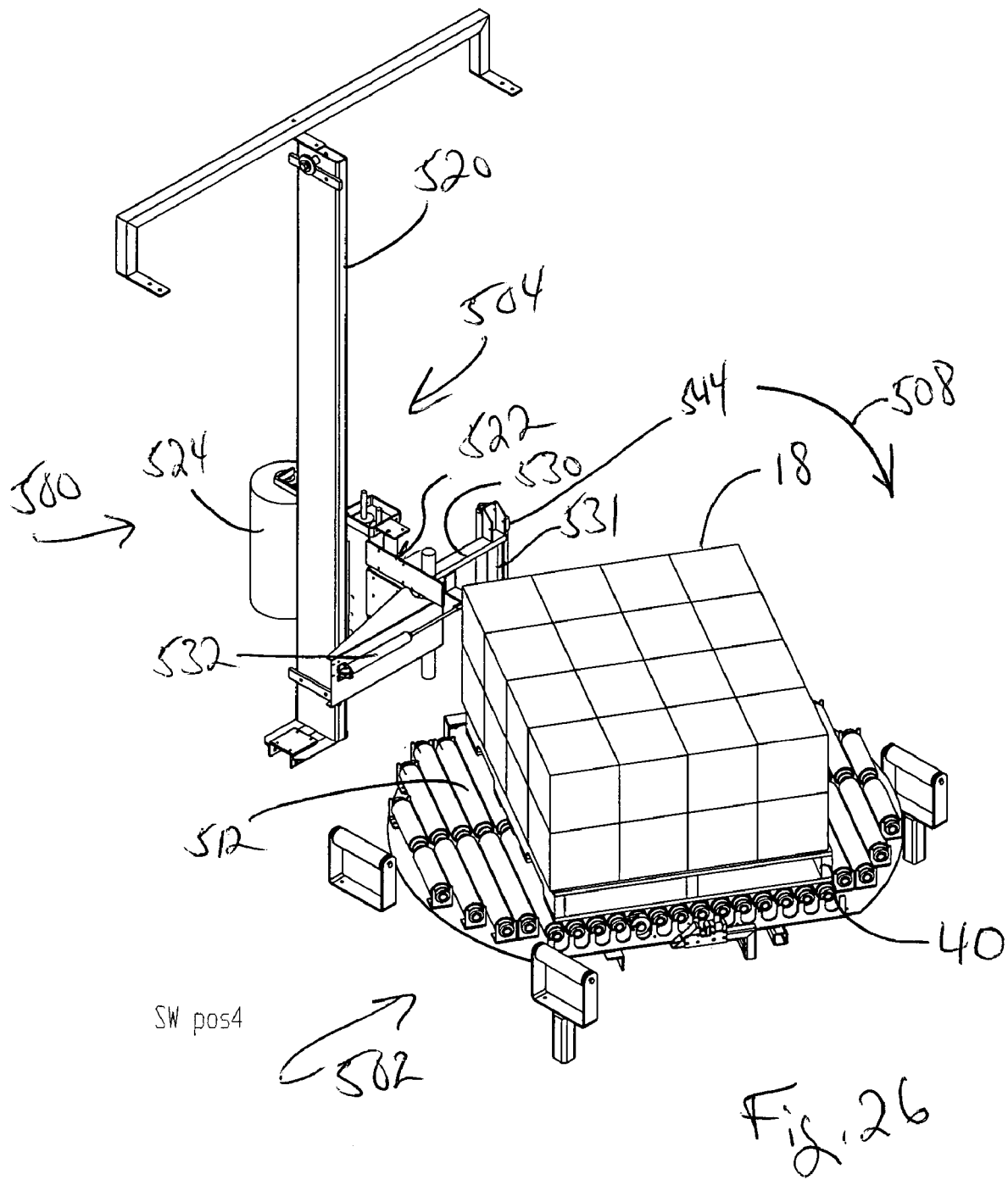

FIG. 26 illustrates turntable 502 rotating in the clockwise direction 508 for stretch wrapping of the partial load of items 18 as stacked upon pallet 40. Thus, a partial load of items 18 may be wrapped according to embodiments of the present invention without necessarily stacking an entire load of items 18. After wrapping the partial load, additional layers of items 18 may be added as described hereafter. In other words, additional layers are deposited upon previously deposited layers with turntable 502 suitably oriented to receive such additional layers. While described herein as occurring just prior to a wrapping procedure, film transfer from clamp 542 to clamp 550 can occur at a variety of times. For example, film transfer can occur before an empty pallet 40 arrives at turntable 502, when an empty pallet 40 is in position upon turntable 502, after deposit of a partial load of items 18, or after completion of deposit of a full load of items 18.

Figure 27:
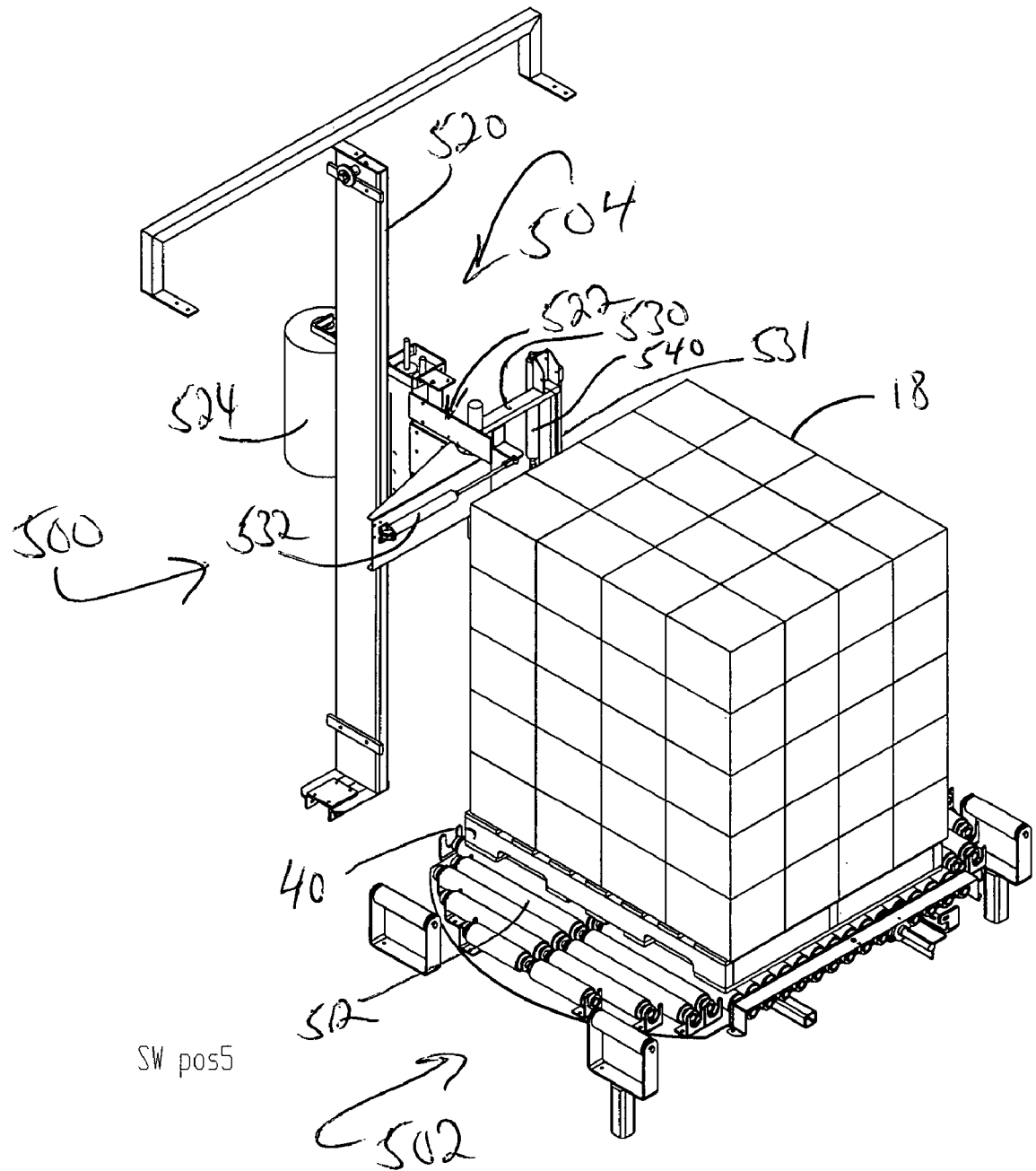

FIG. 27 illustrates a complete load of items 18 stacked upon pallet 40. As shown in FIG. 27, carriage 522 has been moved vertically upward in coordination with stacking operations, i.e., deposit of layers of items 18, whereby ongoing wrapping occurs by coordinated positioning of carriage 522 and rotation of turntable 502. Once the load of items 18 has been completed, turntable 502 may be moved to its home position as indicated in FIG. 27.

Figure 28:
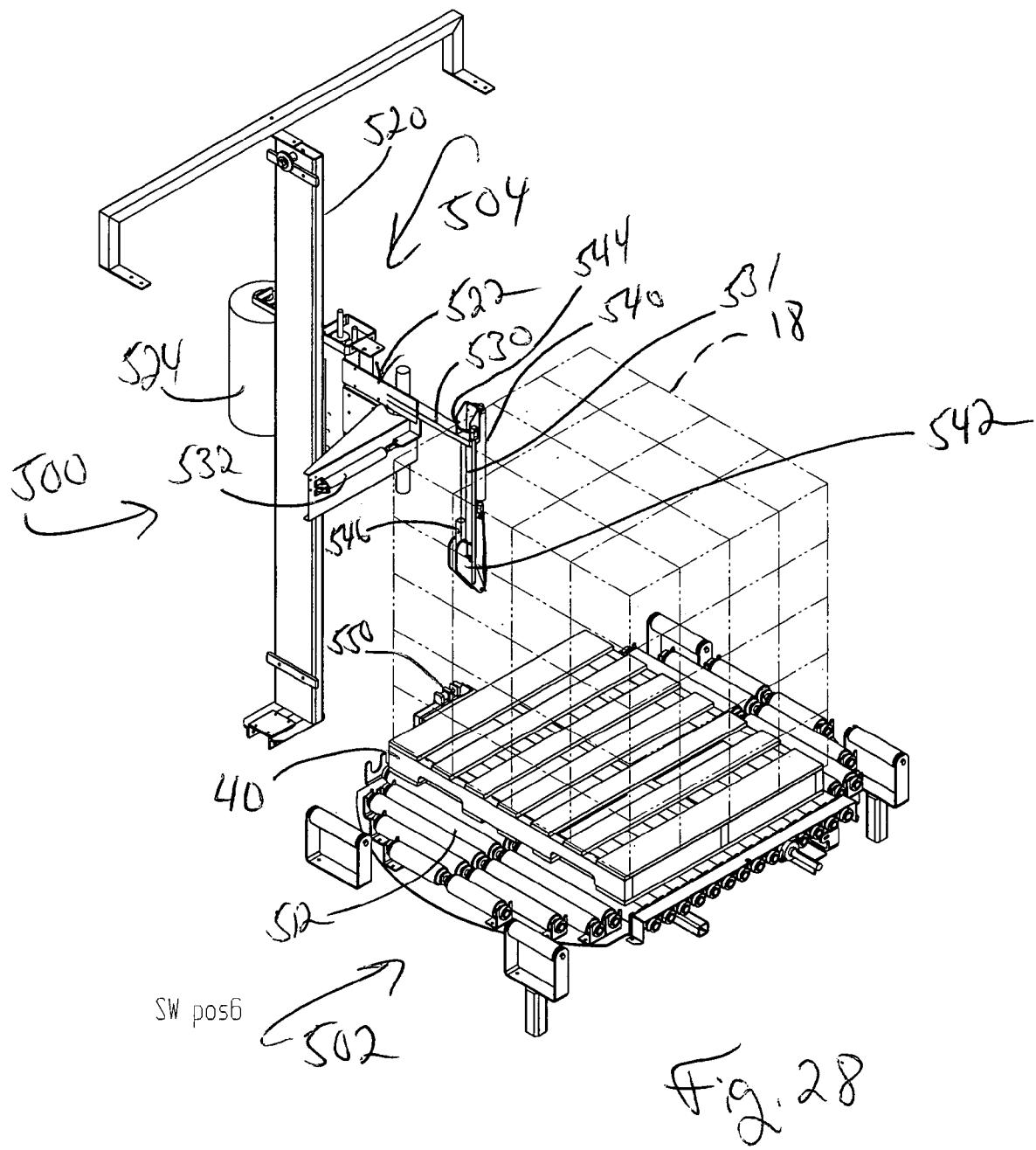

FIG. 28 illustrates severing or cutting of film 524. Arm 530 moves into its extended position as indicated at FIG. 28 and engages film 524. Carriage 522 is then moved slightly vertically upward to gather together a portion of the lower edge or lower portion of film 524 at clamp 542. This establishes a desirable "roping" effect whereby a portion of film 524 is collected together and captured within clamp 542, i.e., between foot 546 and arm 531. Once suitably engaged within clamp 542, cutter 544 may be energized thereby severing film 524 at a point between clamp 542 and the wrapped load of items 18. As may be appreciated, the distal end of film 524, relative to carriage 522, remains gripped at clamp 542 and may be subsequently transferred to turntable clamp 550 in support of further wrapping operations. Once the last layer of items 18 has been placed, a final wrap cycle occurs, including such cutting procedures, to reduce the time of stretch wrapping and thereby allow faster empty pallet change out procedures.

Figure 29:
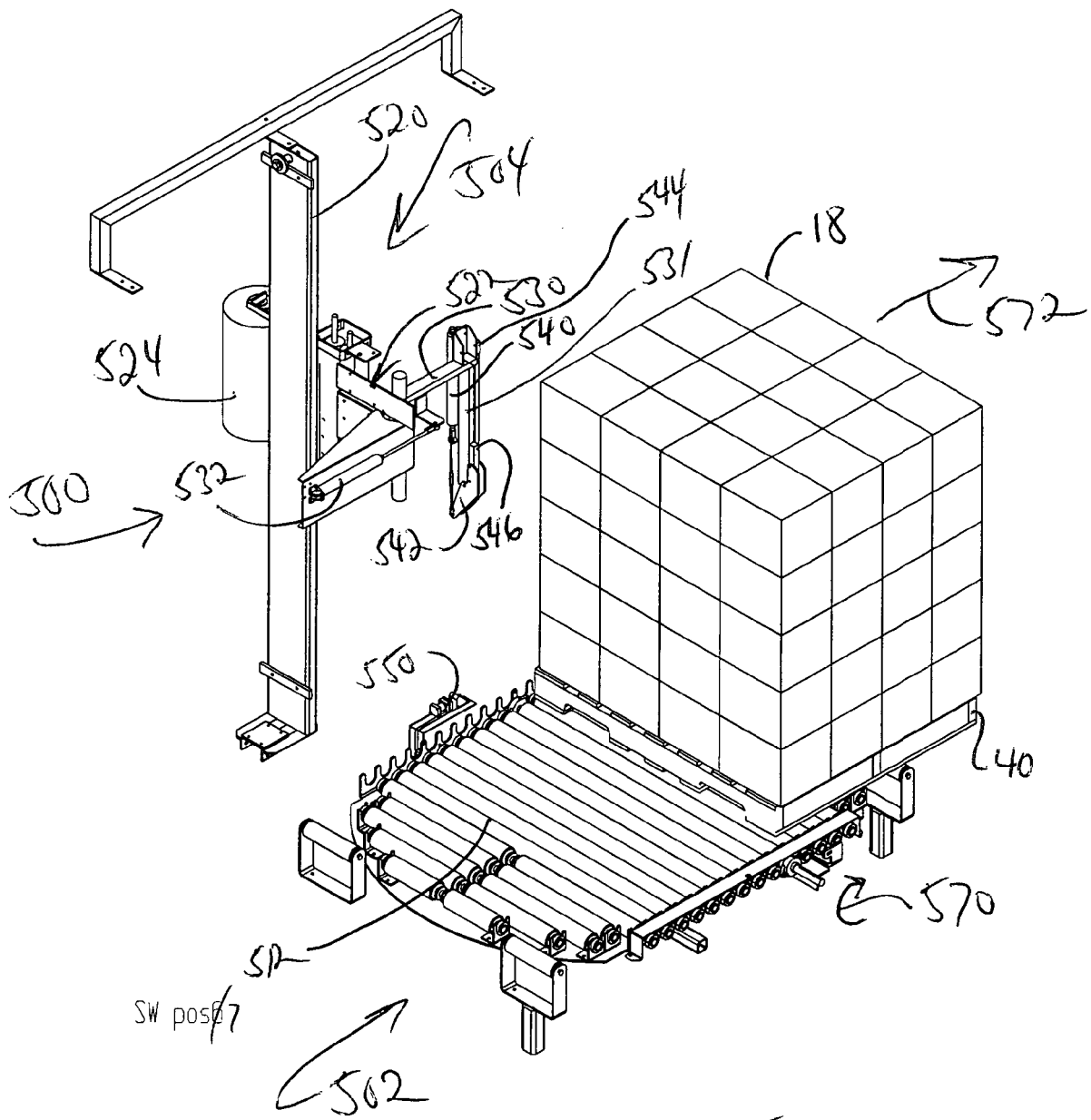

FIG. 29 shows the load of items 18 exiting turntable 502 with arm 530 retracted and film 524 gripped at an upper level where film cutting previously occurred. Thus, once arm 530 has been retracted and a cutting procedure executed, power rollers 512 are actuated as indicated at reference 570 to move the pallet 40 and load of items 18 resting thereon along an exit path 572. Wrapper 500 is then ready to receive a next empty pallet 40 in support of continued cooperative palletizing and wrapping operations.

Figure 30:
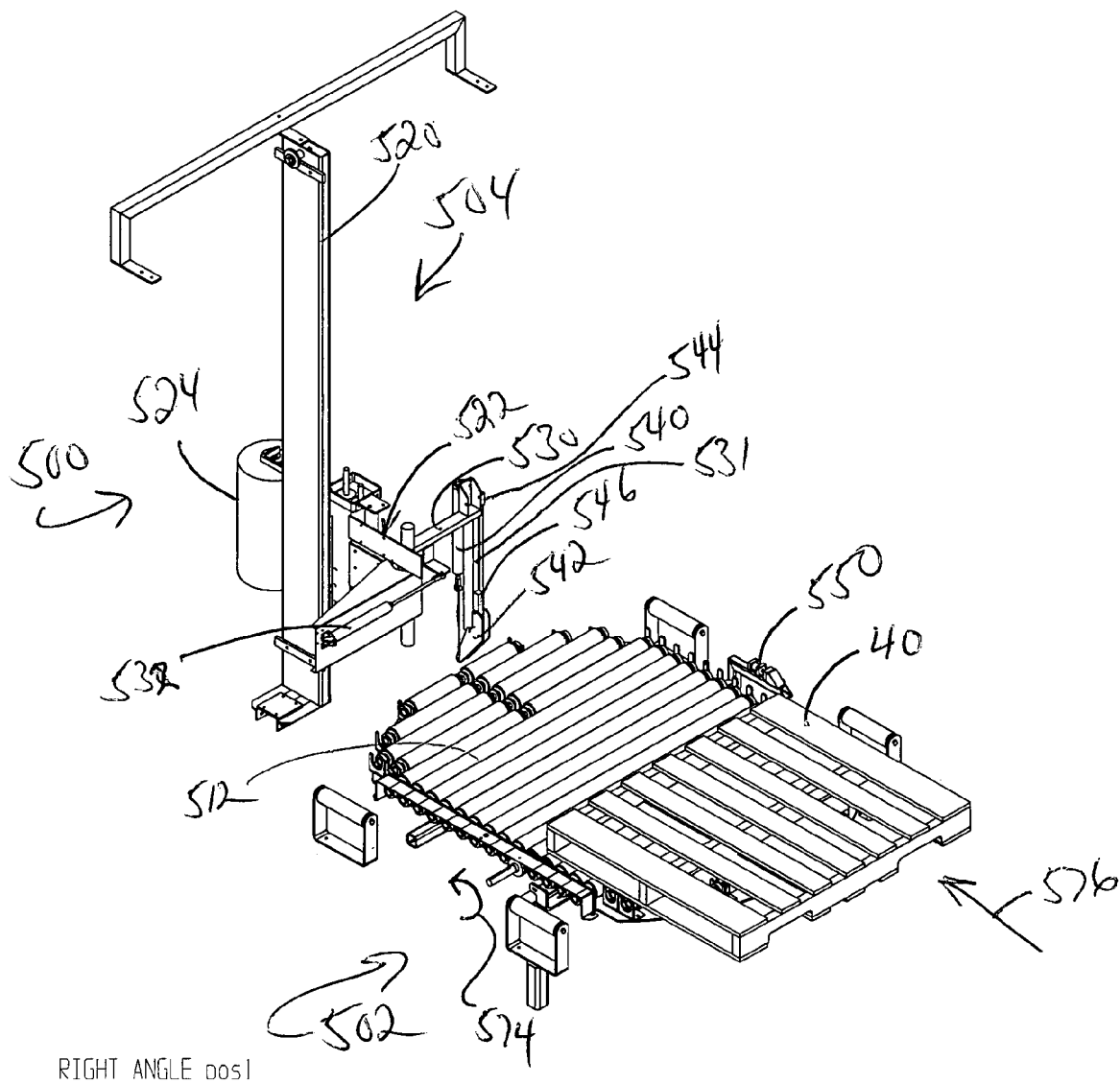

FIG. 30 illustrates pallet 40 entering with turntable clamp 550 not aligned with dispenser 504, i.e., with turntable 502 not in its home position as indicated in FIG. 23. Thus, power rollers 512 are actuated at reference numeral 574 and pallet 40 approached turntable 502 along an approach path 576. Embodiments of the present invention do not necessarily require that turntable 502 be rotated to its home position when receiving a pallet 40. This flexibility in turntable position at the time of receiving an empty pallet 40 benefits palletizing operations. For example, some loads of items 18 benefit from pushing forty inch rows and others benefit from pushing forty eight inch rows of a standard forty inch by forty eight inch pallet. Because film 524 transfer from clamp 542 to clamp 550 need not occur until after items 18 are deposited, improved optimization of load build, i.e., palletizing, can occur without compromising film transfer or attachment relative to turntable 502 or a load of items 18 resting upon pallet 40. Thus, allowing an empty pallet 40 to enter with turntable 502 in other than its home position facilitates optimized palletizing procedures, but avoids undesirable collisions with the incoming empty pallet 40 if the film were to remain attached to turntable 502 at clamp 550.

Turntable film clamp 550 need not be aligned with the stretch wrapper upon pallet entry or palletizing procedures. After a pallet 40 enters turntable 502, pallet 40 can be rotated to a position that maximizes palletizing operations independent of both the turntable clamp 550 and stretch wrapper 500. After layers are deposited and wrapping commences, the load can be rotated to align the turntable clamp 550 and stretch wrapper 500.

Figure 31:
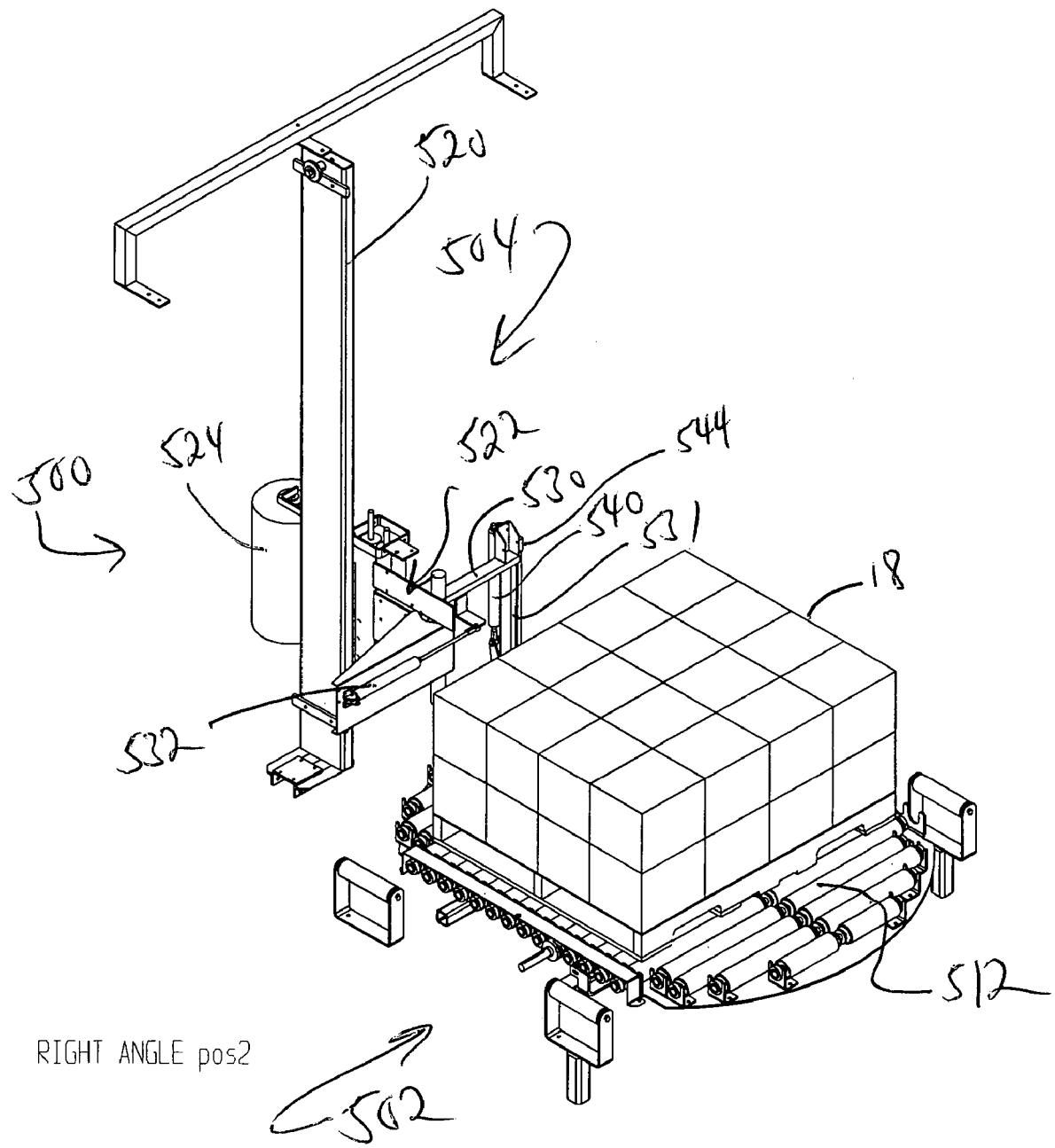

FIG. 31 illustrates a load of items 18 partially built upon pallet 40 with turntable 502 in its non-home position, i.e., as positioned for receiving the empty pallet 40 as indicated in FIG. 30.

Figure 32:
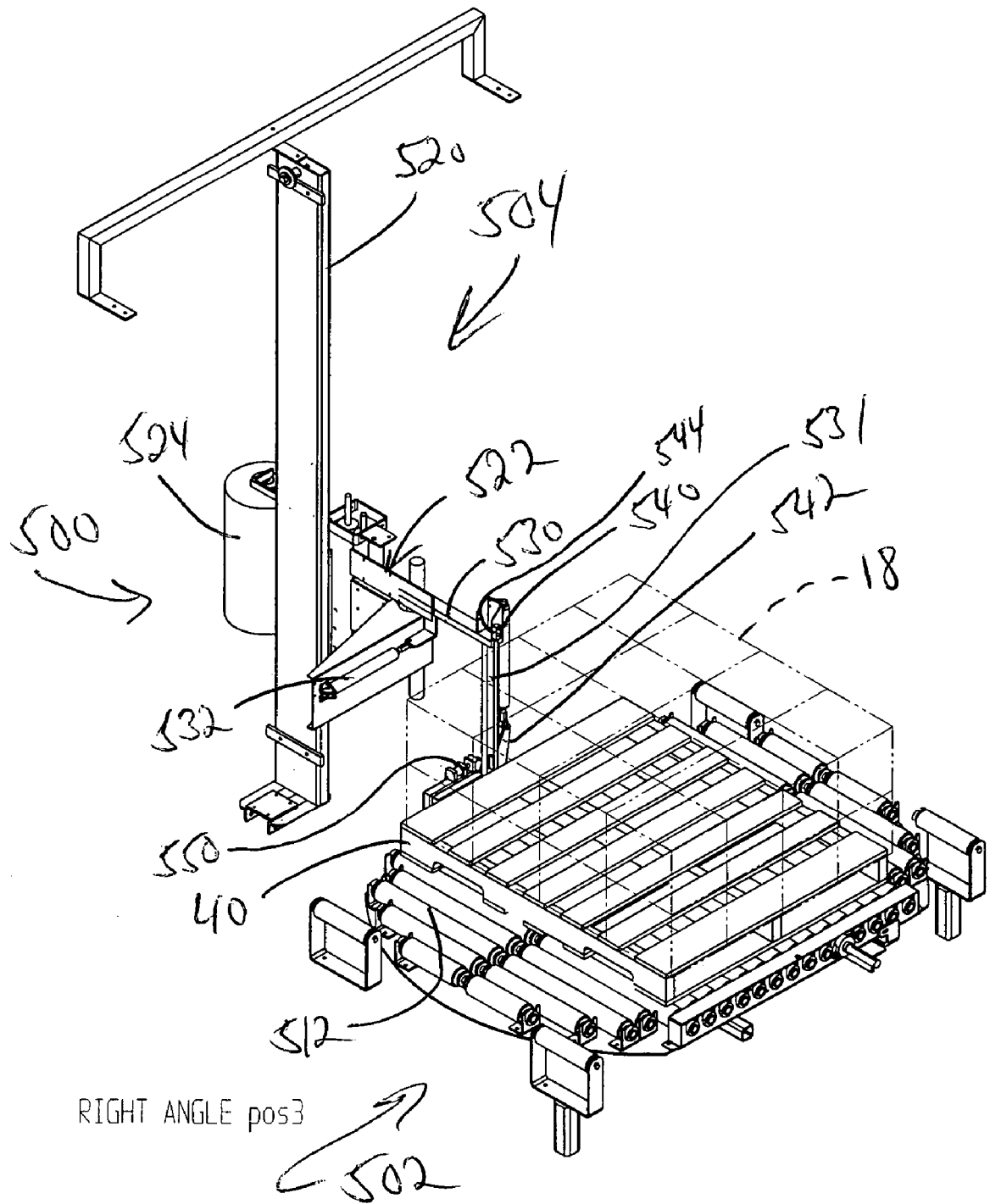

FIG. 32 illustrates turntable 502 having rotated to align turntable clamp 550 with arm clamp 542. Arm 530 may then be actuated to move into alignment with clamp 550, carriage 522 lowered to bring film 524 into position between feet 552 and 554 of clamp 550 clamp 550 activated to engage the lower edge of film 524, and clamp 542 opened to release film 524 and thereby "pass" or transfer film 524 from clamp 542 to clamp 550 in preparation for commencing wrapping operations.

Figure 33:
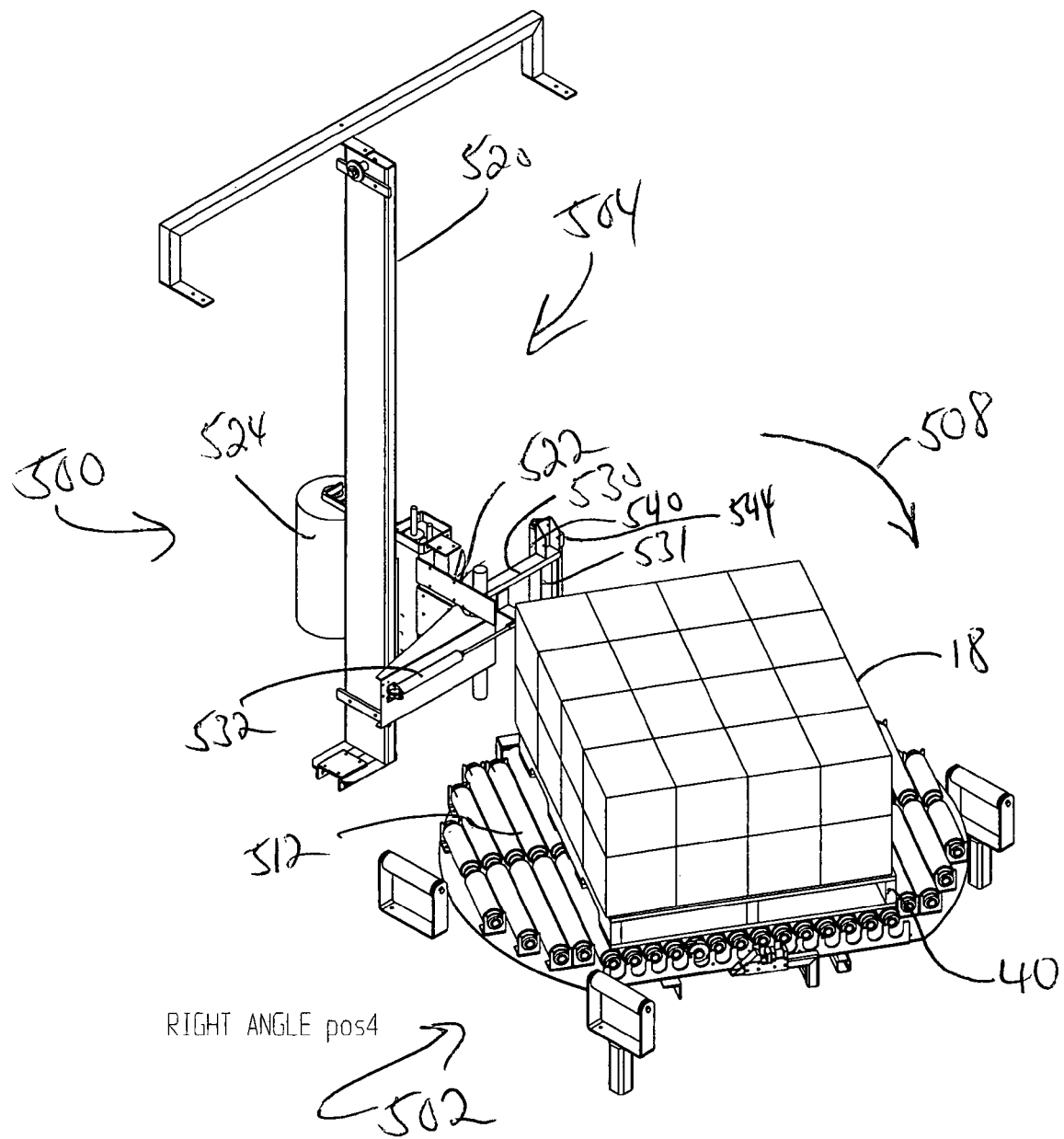
Figure 34:
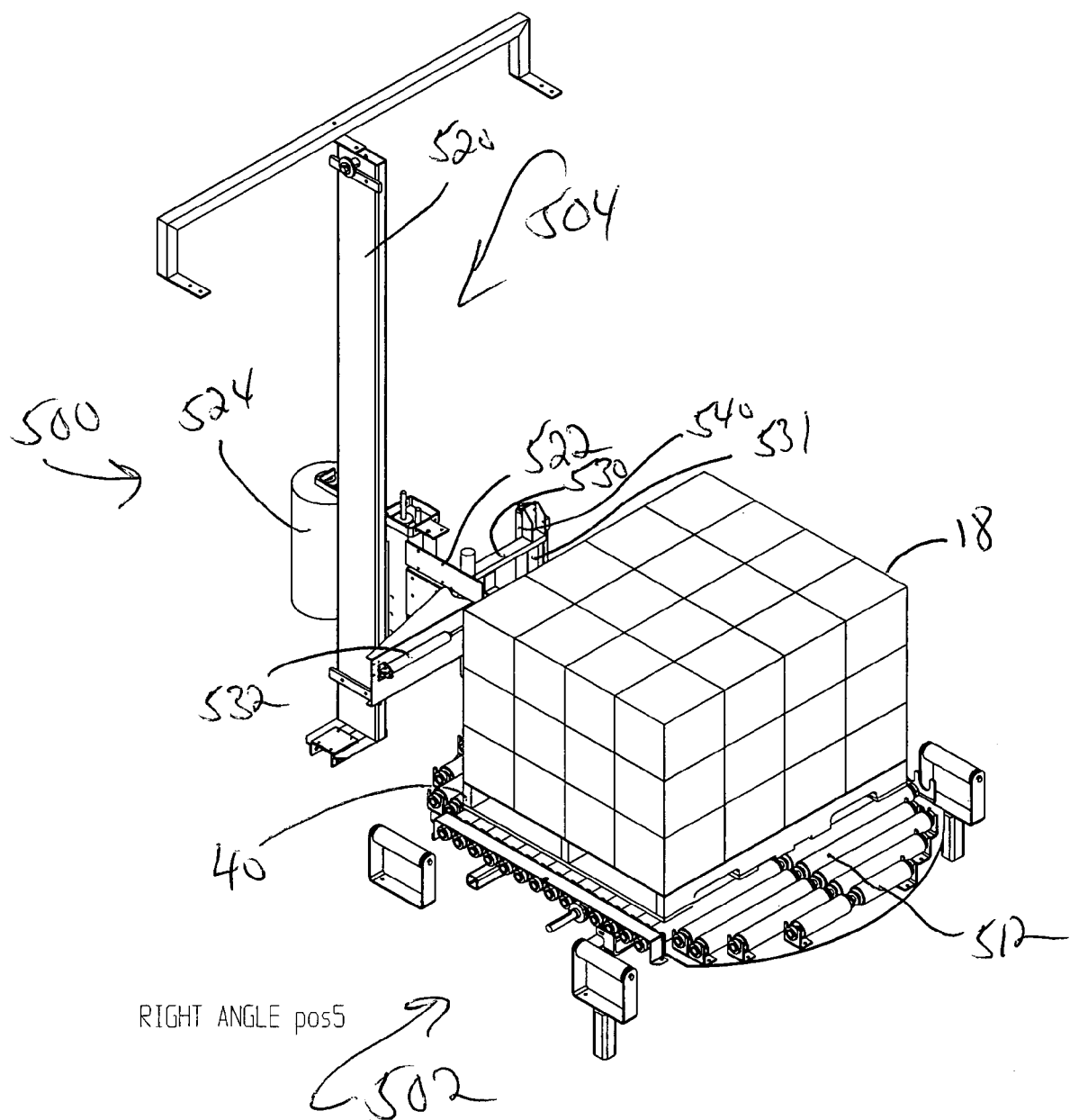
Figure 35:
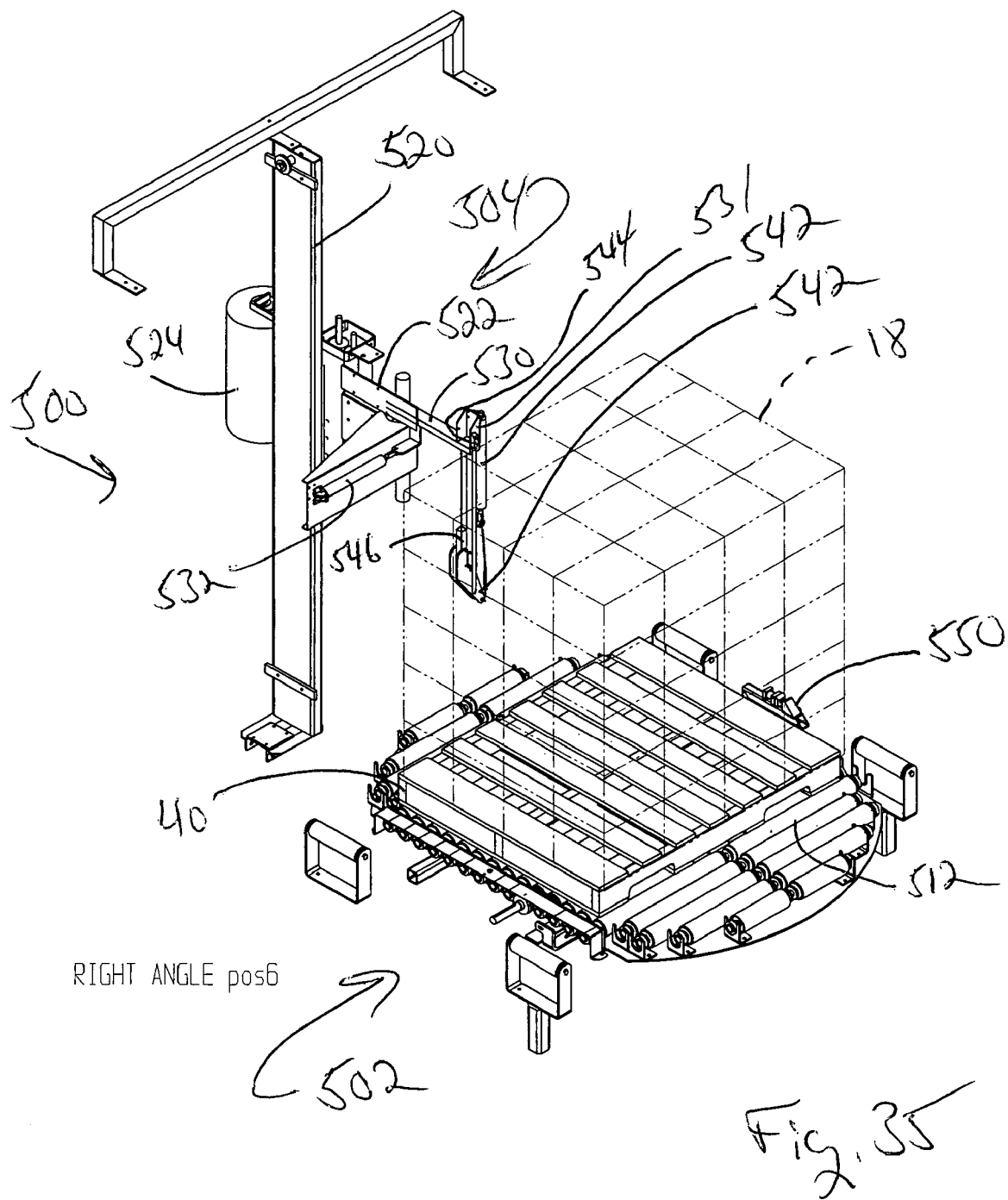
Figure 36:
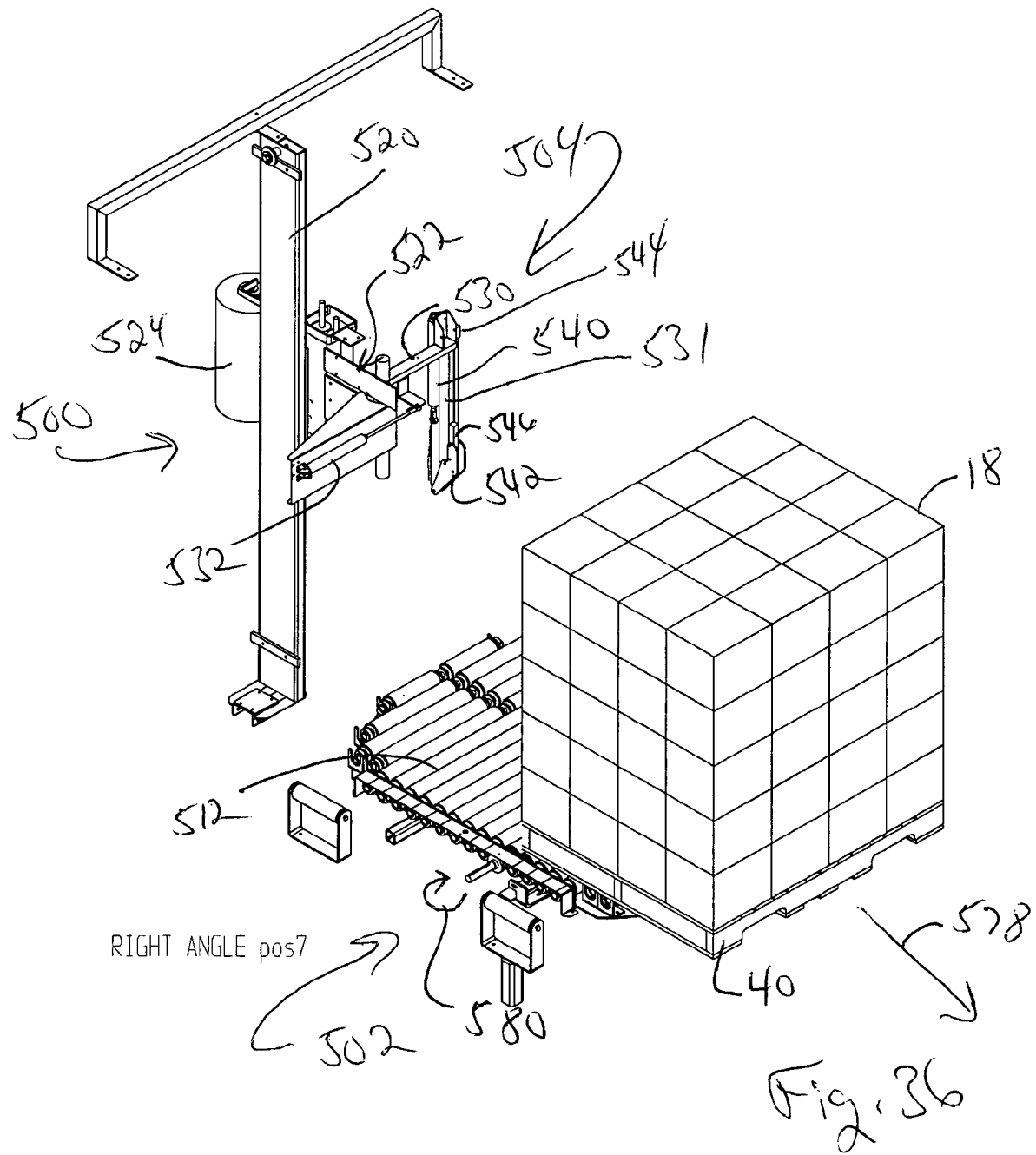

In FIG. 33, wrapping operations commence by rotation of turntable 502, e.g., clockwise in the view of FIG. 33, to encircle the load or partial load of items 18 with film 524. As may be appreciated, in conjunction with rotation of turntable 502 carriage 522 move vertically upward to establish a helical path about the load of items 18 or partial load of items 18. As may be appreciated, wrapping procedures are coordinated with palletizing procedures whereby one or more layers of items 18 may be deposited and wrapping procedures occur relative to such newly deposited items 18. For example, FIG. 34 illustrates orientation of table 502 suitably to receive a next layer of items 18. This next layer of items 18 may be wrapped by rotation of turntable 502, or additional layers of items 18 may be deposited as desired. As illustrated in FIG. 35, eventually a complete load of items 18 are stacked upon pallet 40 and a film cut procedure occurs whereby arm 530 swings into position with clamp 542 in its open position. Thereafter, upward movement of carriage 522 gathers together or "ropes" the lower edge of film 524 and clamp 542 is activated to secure film 524 relative to carriage 522. Cutter 544 is then activated to sever film 524 between clamp 542 and the wrapped load of items 18. FIG. 36 illustrates exit of the wrapped load of items 18 relative to turntable 502 along a selected exit path 578 by activating power rollers 512 as indicated at reference numeral 580. In the illustrated example, the exit path 578 aligns with the entrance path 576 as indicated in FIG. 30. It will be appreciated, however, that any selected exit path could be chosen depending on the surrounding environment, i.e., particular conveyances employed to bring pallets 40 into wrapper 500 and to eject loaded pallets 40 from wrapper 500. Thus, FIG. 36 illustrates a load of items 18 exiting wrapper 500 after arm 530 has retracted and a film cut cycle has occurred independent of turntable clamp 550 position.

It will be appreciated that the present invention is not restricted to the particular embodiment that has been described and illustrated, and that variations may be made therein without departing from the scope of the invention as found in the appended claims and equivalents thereof.

What is claimed is:

1. A layer head for an item handling device having a frame and providing an infeed conveyor having a horizontal row of items, the layer head comprising:
   an item layer building platform defining a vertically positionable item receiving plane, the platform suspended from the frame and adapted to move vertically, the item receiving plane being operable from a height below the infeed conveyor to a position higher than the infeed conveyor;
   a vertically reciprocating horizontally-disposed row conveyor independently suspended from the frame to allow independent vertical movement with respect to the layer building platform wherein the independent vertical movement enables the row conveyor to position in a first plane defined by the infeed conveyor to a second plane defined by the item receiving plane, and the row conveyor having a length approximate to a pallet length and a width less than one-half a pallet width; and
   a puller bar mounted to the layer head and moveable in relation thereto from an extended position to a retracted position and adapted to provide a transfer function pulling the row of items onto the layer head from the infeed conveyor; and wherein
   the item layer building platform further comprises two side plates disposed on opposite sides of a roller platform floor, at least one side plate including a clamping mechanism operable to extend the sideplate from a retracted position adjacent to the edge of the roller platform to an extended position toward the center of the platform to enable a loose build layer to be compacted in a first direction,
   the item layer building platform further comprising a back clamp disposed adjacent and generally perpendicular to at least one side plate, and a selectively pivotable dead plate adapted to provide a transition surface filling a gap between the row conveyor and the item layer building platform in a horizontal position and adapted to pivot to a vertical position to enable the dead plate to provide a secondary backstop, the dead plate further adapted to pivot past the vertical position to cooperate with the back clamp to compress the items in the loose build layer to be compacted in a second direction, the second direction being generally perpendicular to the first direction.

2. The layer head of claim 1 wherein the item layer building platform further comprises:
   the roller platform floor being a selectively retractable roller floor.

3. The layer head of claim 1 wherein the puller bar further comprises:
   a left slide and an oppositely disposed right slide, each respective slide adapted to move slidably relative to the item layer building platform in reciproacating directions.

4. A palletizer for palletizing a row of items, the palletizer comprising:
   a frame adapted to receive items from an infeed conveyor and further adapted to support a layer head and a row conveyor;
   the layer head comprising an item layer building platform defining a vertically positionable item receiving plane, the item receiving plane being operable from a height below the infeed conveyor to a position higher than the infeed conveyor, the platform suspended from the frame and adapted to move vertically, and the platform further comprising a selectively retractable roller floor;
   the row conveyor arranged generally horizontally and suspended from the frame and being vertically reciprocating to allow independent vertical movement with respect to the layer building platform and wherein the row conveyor further adapts to position from a first plane defined by the infeed conveyor to a second horizontal plane, and the row conveyor having a length approximate to a pallet length and a width less than one-half a pallet width; and
   a puller bar mounted to the layer head and moveable in relation thereto from an extended position to a retracted position and adapted to provide a transfer function pulling the row of items onto the layer head from the row conveyor, the puller bar further comprises a left slide and an oppositely disposed right slide, each respective slide adapted to move slidably relative to the layer head in reciproacating directions; and
   a selectively pivotable dead plate disposed between the row conveyor and the layer head, the dead plate being adapted to provide a transition surface filling a gap between the row conveyor and the layer head in a horizontal position and adapted to pivot to a vertical position to enable the dead plate to provide a secondary backstop, the dead plate further adapted to pivot past the vertical position to cooperate with a back clamp on the item layer building platform to compress the items on the item layer building platform.

5. A method of palletizing items comprising:
   providing an infeed conveyor at a fixed relative infeed height;
   providing a vertically adjustable row conveyor operable from the infeed height to a first height below the infeed height and operable to a second height above the infeed height, the row conveyor having a width about one-half to one-third the width of a pallet;
   providing a layer head build platform operable to reciprocate vertically independent of the row conveyor and the layer head build platform vertically operable to coincide with the first and second heights;
   providing a puller bar on the layer head build platform, the puller bar being operable to selectively reciprocate in a horizontal plane and having a range of motion to extend over the row conveyor;

aligning the row conveyer to the infeed conveyor;
accumulating a row of items on the row conveyor;
aligning the row conveyer to the layer head build platform;
extending the puller bar to the row conveyor; and
pulling the row of items with the puller bar to the layer head build platform;
providing a pivotable dead plate;
placing the dead plate in a horizontal position to enable a transition of the row of items from the row conveyor to the layer head build platform;
pivoting the dead plate to a second position to enable the dead plate to act as a secondary stop, the dead plate further adapted to pivot past the vertical position to cooperate with a back clamp on the layer head build platform to compress the items on the layer head build platform;
pivoting the dead plate to compress items on the layer head build platform.

* * * * *